US012605959B2

(12) United States Patent
Wetsch

(10) Patent No.: US 12,605,959 B2
(45) Date of Patent: Apr. 21, 2026

(54) STATIONS FOR FORMING HEAT SEALS IN ENVELOPES

(71) Applicant: Pregis LLC, Chicago, IL (US)

(72) Inventor: Thomas D. Wetsch, Naples, FL (US)

(73) Assignee: Pregis LLC, Chicago, IL (US)

(*) Notice: Subject to any disclaimer, the term of this patent is extended or adjusted under 35 U.S.C. 154(b) by 0 days.

(21) Appl. No.: 18/963,214

(22) Filed: Nov. 27, 2024

(65) Prior Publication Data

US 2025/0170851 A1 May 29, 2025

Related U.S. Application Data

(60) Provisional application No. 63/603,906, filed on Nov. 29, 2023.

(51) Int. Cl.
*B65B 51/00* (2006.01)
*B43M 5/04* (2006.01)
*B65B 51/14* (2006.01)

(52) U.S. Cl.
CPC ........... *B43M 5/045* (2013.01); *B65B 51/146* (2013.01)

(58) Field of Classification Search
CPC ... B29C 66/1122; B29C 66/849; B29C 65/18; B29C 66/8322; B29C 66/8242; B65B 43/465; B65B 61/186; B65B 5/022; B65B 51/146; B65B 3/02; B65B 1/02; B65B 9/08; B65B 9/12
USPC ... 53/469, 459, 284.7, 374.9, 570, 479, 571, 53/374.8, 451, 477, 551, 550, 456
See application file for complete search history.

(56) References Cited

U.S. PATENT DOCUMENTS

| | | | | |
|---|---|---|---|---|
| 2,277,116 | A | 3/1942 | Krueger | |
| 3,683,756 | A | 8/1972 | Wilson | |
| 3,952,480 | A * | 4/1976 | Nordstrom | B65B 7/06 53/562 |
| 4,136,502 | A * | 1/1979 | Shore | B65B 31/06 53/493 |
| 4,609,421 | A * | 9/1986 | Yui | B43M 5/042 493/260 |
| 5,930,983 | A * | 8/1999 | Terminella | B65B 61/188 53/436 |
| 5,966,907 | A * | 10/1999 | Julius | B65B 51/30 53/550 |
| 6,227,272 | B1 | 5/2001 | Lindsay et al. | |

(Continued)

FOREIGN PATENT DOCUMENTS

| | | | |
|---|---|---|---|
| JP | 5703461 | B2 | 4/2015 |
| SE | 1551179 | A1 | 3/2017 |
| WO | 2014140394 | A1 | 9/2014 |

OTHER PUBLICATIONS

International Search Report and Written Opinion for International Application No. PCT/US24/57880, filed Nov. 27, 2024, mailed Apr. 2, 2025.

*Primary Examiner* — Jacob A Smith
(74) *Attorney, Agent, or Firm* — Fox Rothschild LLP

(57) ABSTRACT

Stations for sealing envelopes include a spacer, a positioning surface, and an envelope support surface configured to support the envelopes. A sealing mechanism is provided with sealing members configured to apply heat and pressure to a sealable member on the envelope to form a closure seal. The spacer and the positioning surface are configured to align the sealable member with the sealing members when the envelope is resting on the envelope support surface.

28 Claims, 12 Drawing Sheets

(56) References Cited

U.S. PATENT DOCUMENTS

| | | | | |
|---|---|---|---|---|
| 11,383,456 | B2 | 7/2022 | Hamlin et al. | |
| 2008/0276576 | A1* | 11/2008 | Anderson | B29C 66/43122 53/565 |
| 2011/0088351 | A1* | 4/2011 | Zeiler | B29C 66/133 53/551 |
| 2012/0055120 | A1* | 3/2012 | Bierschenk | B65B 51/146 53/551 |
| 2015/0107780 | A1* | 4/2015 | Hull | B29C 66/8167 156/580.1 |

* cited by examiner

STATIONS FOR FORMING HEAT SEALS IN ENVELOPES

CROSS-REFERENCE TO RELATED APPLICATIONS

This application claims priority to U.S. Provisional Application No. 63/603,906, filed Nov. 29, 2023, the disclosure of which is incorporated by reference herein in its entirety.

BACKGROUND

Small to medium-sized items commonly are mailed or shipped in sealed envelopes. In many applications, the envelopes include a sealable member that is activated by the application of heat and pressure thereto once the envelope has been loaded. The heat-activated sealable member, upon cooling, forms a closure seal that maintains the envelope in a closed state until the recipient opens the envelope to retrieve its contents.

Shipping envelopes used in e-commerce and other commercial applications often are supplied as a web of interconnected envelopes. The web is adapted for use with an automated packaging machine, or bagger, that can advance the web, open the envelope to be loaded, apply heat and pressure to the sealable member after the envelope has been loaded, and separate the sealed envelope from the web. A typical automated bagger is relatively large, and changing the size of the envelopes to be loaded requires changing out the web of envelopes being supplied to the bagger, and may require reconfiguration of the bagger.

SUMMARY

In one aspect of the disclosed technology, a station for sealing an envelope includes a sealing mechanism having a first and a second sealing member configured to apply heat and pressure to a sealable member on the envelope when the sealable member is disposed between the first and second sealing members. The heat and pressure are sufficient to activate the sealable member and form a closure seal in the envelope. The station also includes a spacer configured to position the first and second sealing members at a predetermined first distance from a positioning surface that corresponds to a spacing between a closed bottom of the envelope and the sealable member to align the sealable member with the first and second sealing members when the envelope is positioned against the positioning surface. The station further includes a lateral guide configured and positioned with respect to the sealing mechanism and spacer to guide and orient the envelope laterally into contact with the positioning surface.

In another aspect of the disclosed technology, the lateral guide comprises a sidewall configured to center the envelope with respect to the first and second sealing members.

In another aspect of the disclosed technology, the positioning surface comprises an envelope support surface configured to support the envelope.

In another aspect of the disclosed technology, the station further includes a shelf, and the shelf comprises the spacer and the positioning surface.

In another aspect of the disclosed technology, the sidewall is inclined inwardly and downwardly.

In another aspect of the disclosed technology, the sidewall is a first sidewall and the lateral guide further includes a second sidewall. The lateral guide is configured so that a spacing between the first and second sidewalls is variable.

In another aspect of the disclosed technology, the shelf is further configured so that a height of the surface of the shelf in relation to the first and second sealing members is adjustable to align the sealable member with the first and second sealing members when the envelope is resting on the surface of the shelf.

In another aspect of the disclosed technology, the shelf is configured to tilt between a first angular orientation position at which the surface of the shelf supports the envelope, and a second angular orientation at which the envelope can fall from the shelf.

In another aspect of the disclosed technology, the shelf includes a lip, and a back portion connected to the lip. The positioning surface includes an upper surface of the lip, and the spacer comprises the back portion. The upper surface of the lip is configured to engage a bottom edge of the envelope.

In another aspect of the disclosed technology, a major surface of the back portion is configured to engage a wall of the envelope, and the major surface of the back portion is angled in relation to the vertical direction.

In another aspect of the disclosed technology, the station further includes an actuator mechanism configured to move the first sealing member between a first position and a second position.

In another aspect of the disclosed technology, the first sealing member is further configured to urge the envelope into the second sealing member when the first sealing member is in the second position of the first sealing member so that the sealable member is squeezed and compressed.

In another aspect of the disclosed technology, the station further includes a base, and the shelf and the sealing mechanism are mounted on the base.

In another aspect of the disclosed technology, the station further includes a column mounted on the base. The shelf is mounted on the column, and the column is configured to raise and lower the shelf in relation to the sealing mechanism.

In another aspect of the disclosed technology, the base includes a plurality of legs, and a platform coupled to and supported by the legs. At least one of the sealing mechanism and the shelf is mounted on the platform.

In another aspect of the disclosed technology, the platform is a first platform, and the station further includes a second platform coupled to and supported by the legs and positioned below the first platform.

In another aspect of the disclosed technology, the sealing mechanism is mounted on the first platform, and the shelf is mounted on the second platform.

In another aspect of the disclosed technology, the second platform has an opening therein. The opening is located below, and is aligned with the shelf.

In another aspect of the disclosed technology, a packing and conveying system includes the above station, and at least one of a conveyor and a container configured to be positioned below the opening in the second platform and to receive the envelope by way of the opening. In another aspect of the disclosed technology, a station for sealing an envelope includes a sealing mechanism having a first and a second sealing member configured to apply heat and pressure to a sealable member on the envelope when the sealable member is disposed between the first and second sealing members. The heat and pressure are sufficient to activate the sealable member and form a closure seal in the envelope. The station also includes a spacer configured to position the first and second sealing members at a predetermined first distance from a positioning surface that corresponds to a spacing between a closed bottom of the envelope and the sealable member to align the sealable member with the first and second sealing members when the envelope is positioned against the positioning surface. The station further includes a cover. An opening is formed in the cover. The opening is located above the shelf and configured to permit the envelope to be lifted and retrieved from the positioning surface manually.

In another aspect of the disclosed technology, the positioning surface comprises an envelope support surface configured to support the envelope.

In another aspect of the disclosed technology, the station further includes a shelf, and the shelf comprises the spacer and the positioning surface.

In another aspect of the disclosed technology, the opening is configured to permit the envelope to be lowered onto the shelf manually.

In another aspect of the disclosed technology, the opening is configured to center the envelope with respect to the first and second sealing members.

In another aspect of the disclosed technology, the cover includes a planar upper surface.

In another aspect of the disclosed technology, the shelf is configured to elevate an upper end of the envelope above the upper surface when the envelope is supported by the shelf.

In another aspect of the disclosed technology, the upper surface is configured to facilitate loading of the envelope while the envelope is resting on the upper surface.

In another aspect of the disclosed technology, the upper surface has a width of at least about two feet and a depth of at least about two feet.

In another aspect of the disclosed technology, the upper surface has a width between about two feet and about five feet, and a depth between about two feet and about five feet.

In another aspect of the disclosed technology, the upper surface of the cover is an uppermost surface of the station.

In another aspect of the disclosed technology, the station further includes a base. The support, the sealing mechanism, and the cover are mounted on the base.

In another aspect of the disclosed technology, the base is configured to support the station from a supporting surface, and to elevate the upper surface by about two feet to about five feet above the supporting surface.

In another aspect of the disclosed technology, a packaging system includes a plurality of envelopes unconnected to each other and each having a first flexible wall, and a second flexible wall overlying the first flexible wall and fixed to the first flexible wall about at least a portion of a pocket border. The pocket border encloses a pocket defined between the first and second flexible walls and is configured and dimensioned to contain an item. At least one of the first and second flexible walls defines a pocket opening allowing access to the pocket from an exterior of the envelope for loading the item into the pocket. Each of the envelopes also has a sealable member disposed on the first wall and configured to form a closure seal that fixes the first wall to the second wall at the pocket opening to seal the pocket closed.

The packaging system also includes a sealing station that includes a sealing mechanism having a first and a second sealing member configured to apply heat and pressure to a respective sealable member on each of the envelopes when the sealable member is disposed between the first and second sealing members. The heat and pressure are sufficient to activate the sealable member and form the closure seal. The station also includes a spacer configured to position the first and second sealing members at a predetermined first distance from a positioning surface that corresponds to a spacing between a closed bottom of the envelope and the sealable member to align the sealable member with the first and second sealing members when the envelope is positioned against the positioning surface.

In another aspect of the disclosed technology, the positioning surface comprises an envelope support surface configured to support the envelope.

In another aspect of the disclosed technology, the station further includes a shelf, and the shelf comprises the spacer and the positioning surface.

In another aspect of the disclosed technology, the shelf is configured to support a lower edge of the envelopes, and a distance between the lower edge of the envelopes and the sealable member of the envelopes is about equal to a distance between the surface of the shelf and the first sealing member.

In another aspect of the disclosed technology, the first sealing member is a first sealing jaw, and the second sealing member is a second sealing jaw.

In another aspect of the disclosed technology, the sealable member includes a heat-activatable material.

In another aspect of the disclosed technology, the heat-activatable material is one of a heat-sealable material and a hot-melt adhesive.

In another aspect of the disclosed technology, at least one of the first and second sealable members include a heating element.

In another aspect of the disclosed technology, at least one of the first and second walls of the envelope includes paper.

In another aspect of the disclosed technology, at least one of the first and second walls of the envelope includes extensible paper.

In another aspect of the disclosed technology, a method for sealing an envelope includes manually placing the envelope on a positioning surface of a sealing station so that a sealable member on the envelope aligns with a sealing member of the sealing station, and applying heat and pressure to the sealable member using the sealing member. The heat and pressure are sufficient to activate the sealable member and form a closure seal in the envelope. The method also includes removing the sealed envelope from the positioning surface.

In another aspect of the disclosed technology, the method further includes lowering the envelope onto the positioning surface.

In another aspect of the disclosed technology, the method further includes lowering the envelope onto the positioning surface through an opening in a cover of the sealing station.

In another aspect of the disclosed technology, the method further includes raising the envelope from the positioning surface.

In another aspect of the disclosed technology, the method further includes raising the envelope from the positioning surface through an opening in a cover of the sealing station.

In another aspect of the disclosed technology, the method further includes reaching through the opening and grasping the envelope.

In another aspect of the disclosed technology, the method further includes adjusting a height of the positioning surface so that the sealable member aligns with the sealing member when the envelope is placed on the positioning surface.

In another aspect of the disclosed technology, the method further includes adjusting a vertical position of the positioning surface in relation to the sealing member so that an upper edge of the envelope is located above the opening in the cover when the envelope is placed on the positioning surface.

In another aspect of the disclosed technology, the envelope is a first envelope, and the method further includes adjusting a vertical position of the positioning surface in relation to the sealing member so that a sealable member on a second of the envelopes aligns with the sealing member when the second envelope is placed on the positioning surface. The second envelope has a height different than a height of the first envelope. The method also includes applying heat and pressure to the sealable member of the second envelope using the sealing member. The heat and pressure are sufficient to activate the sealable member of the second envelope and form a closure seal in the second envelope. The method further includes removing the sealed second envelope from the positioning surface.

In another aspect of the disclosed technology, a station for sealing an envelope includes a housing, and a sealing mechanism mounted on the housing and comprising a first and a second sealing member configured to apply heat and pressure to a sealable member on the envelope when the sealable member is disposed between the first and second sealing members. The heat and pressure are sufficient to activate the sealable member and form a closure seal in the envelope. The station also includes a support configured to engage the housing and to support the housing from a supporting surface. The housing and the sealing mechanism are configured so that the envelope can rest on the supporting surface when the sealable member is disposed between the first and second sealing members. The support is configured so that a position of the support in relation to the housing is variable thereby facilitating adjustment of the elevation of the housing and the sealing mechanism above the supporting surface to align the sealable member with the first and second sealing members when the envelope is resting on the supporting surface.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the appended drawings, wherein like numerals denote like elements.

DETAILED DESCRIPTION

Figure 1:
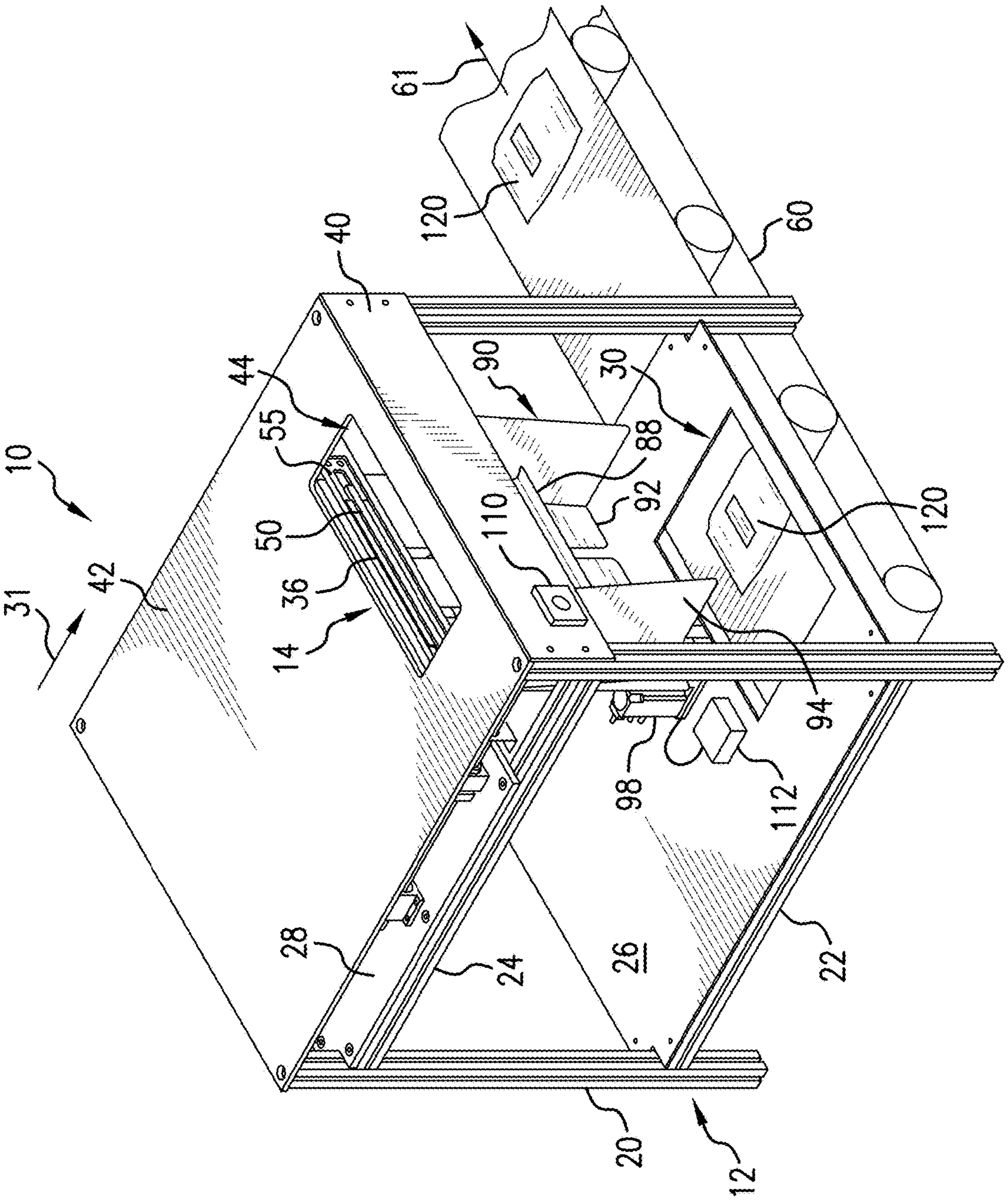
FIG. 1 is a top-front perspective view of a station for forming heat seals in envelopes, depicting a sealing jaw of the station in an open position.

The inventive concepts are described with reference to the attached figures, wherein like reference numerals represent like parts and assemblies throughout the several views. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts.

Figure 2:
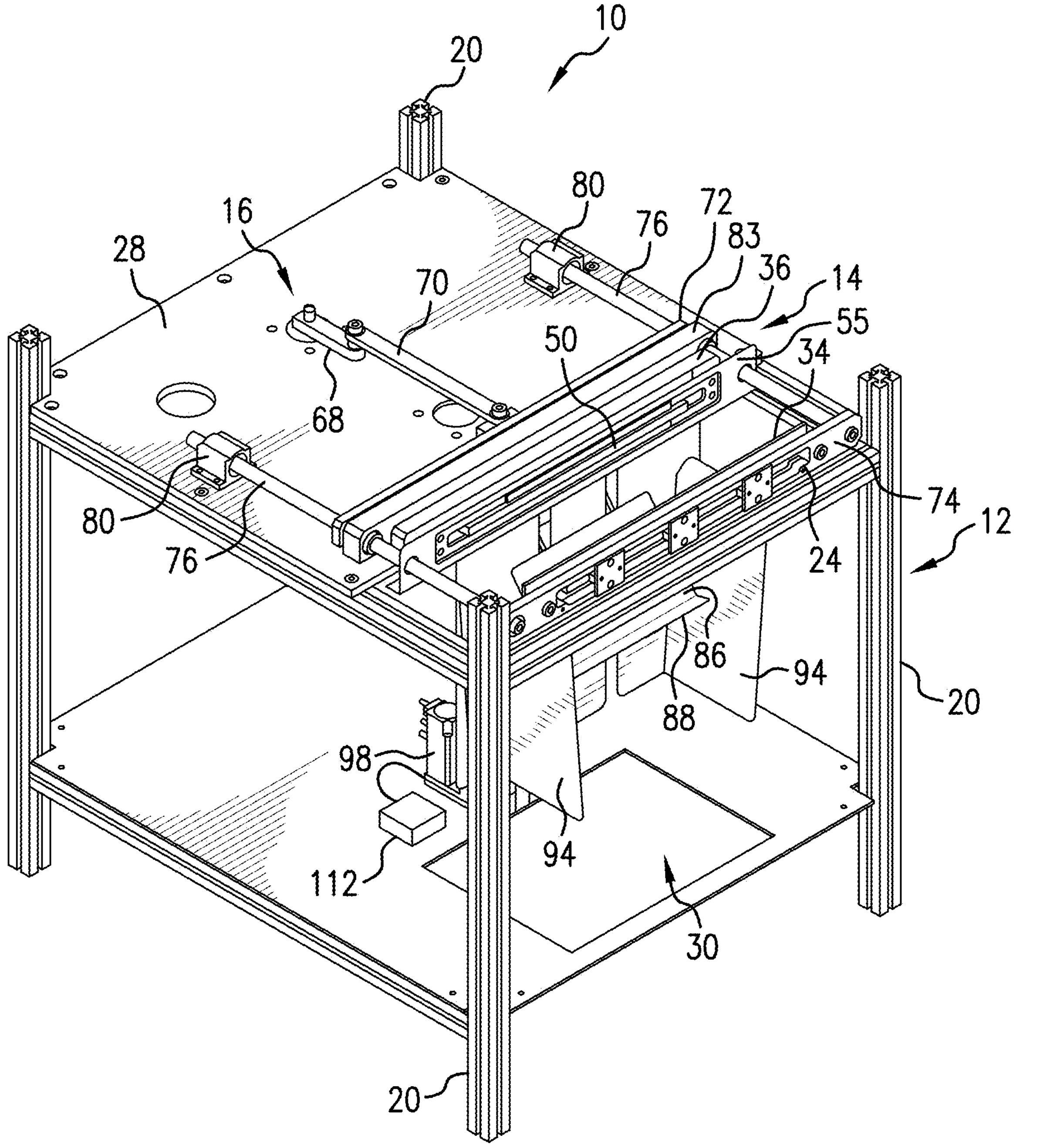
FIG. 2 is a top-front perspective view of the station shown in FIG. 1, with a cover and a front guard plate of the station removed for clarity of illustration, and depicting the sealing jaw in the open position.
Figure 3:
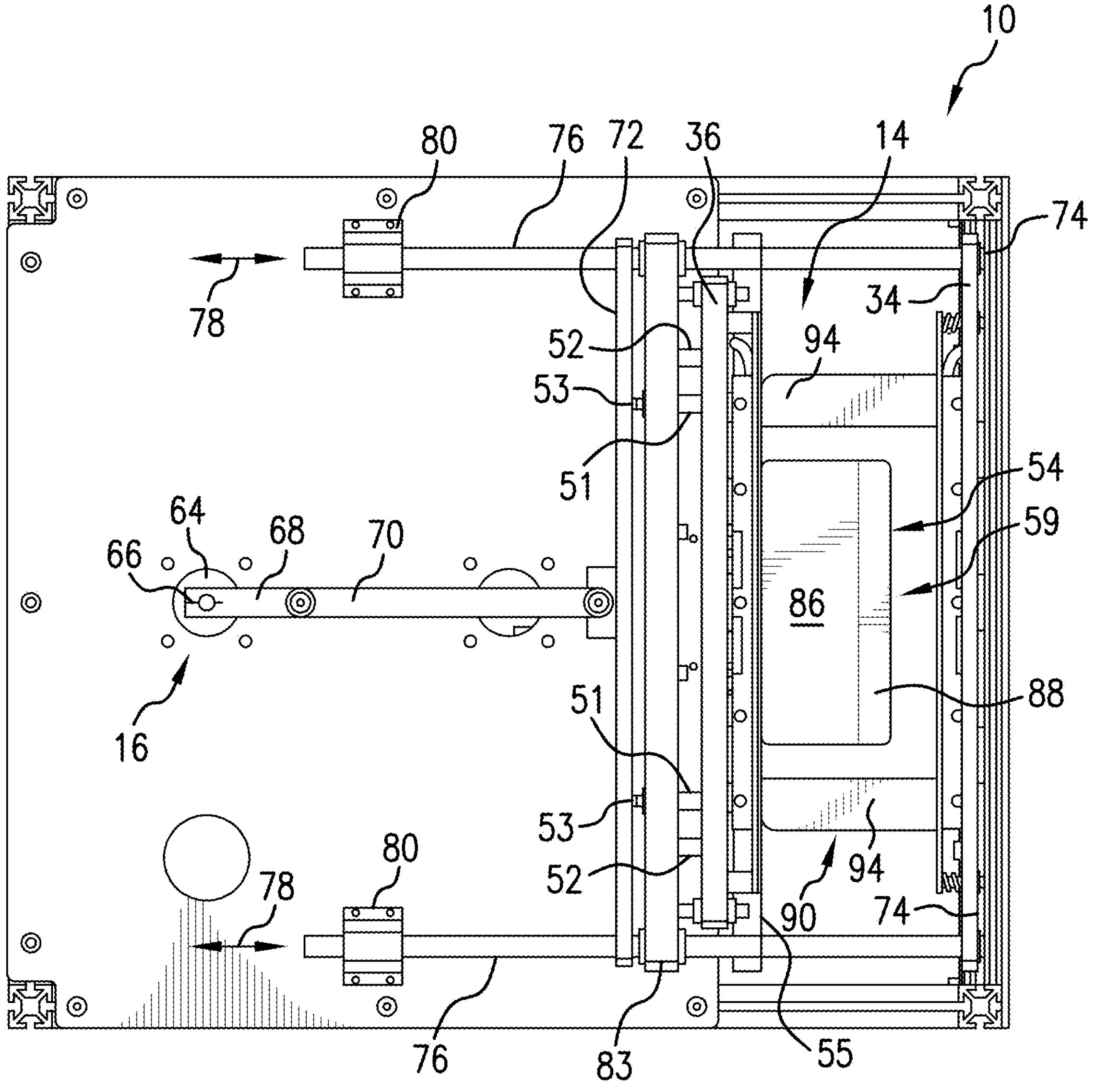
FIG. 3 is a top view of the station shown in FIGS. 1 and 2, with the cover and the front guard plate of the station removed, and depicting the sealing jaw in the open position.
Figure 4:
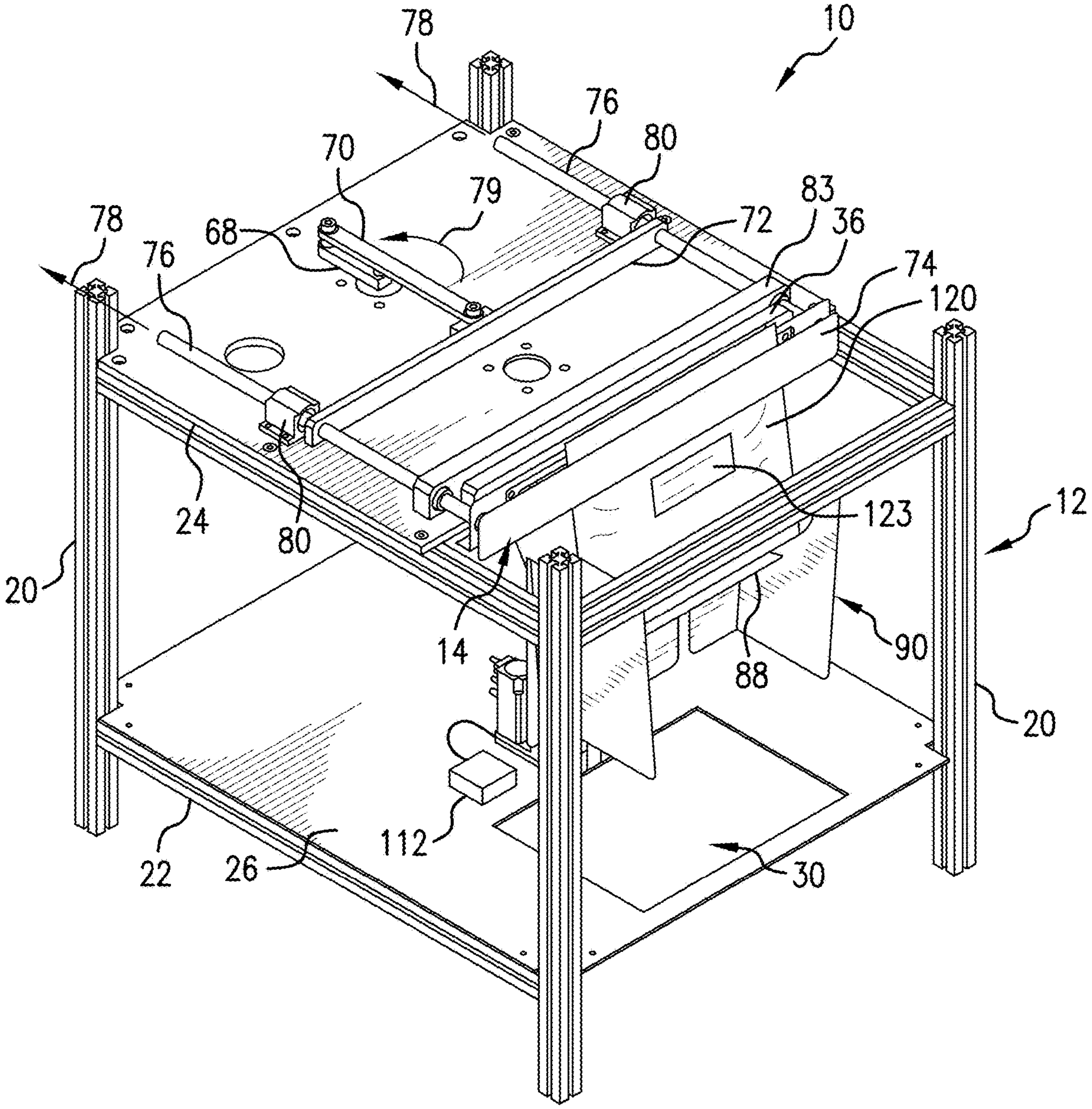
FIG. 4 is a top-front perspective view of the station shown in FIGS. 1-3, with the cover and the front guard plate of the station removed, and depicting the sealing jaw in a closed position.
Figure 5:
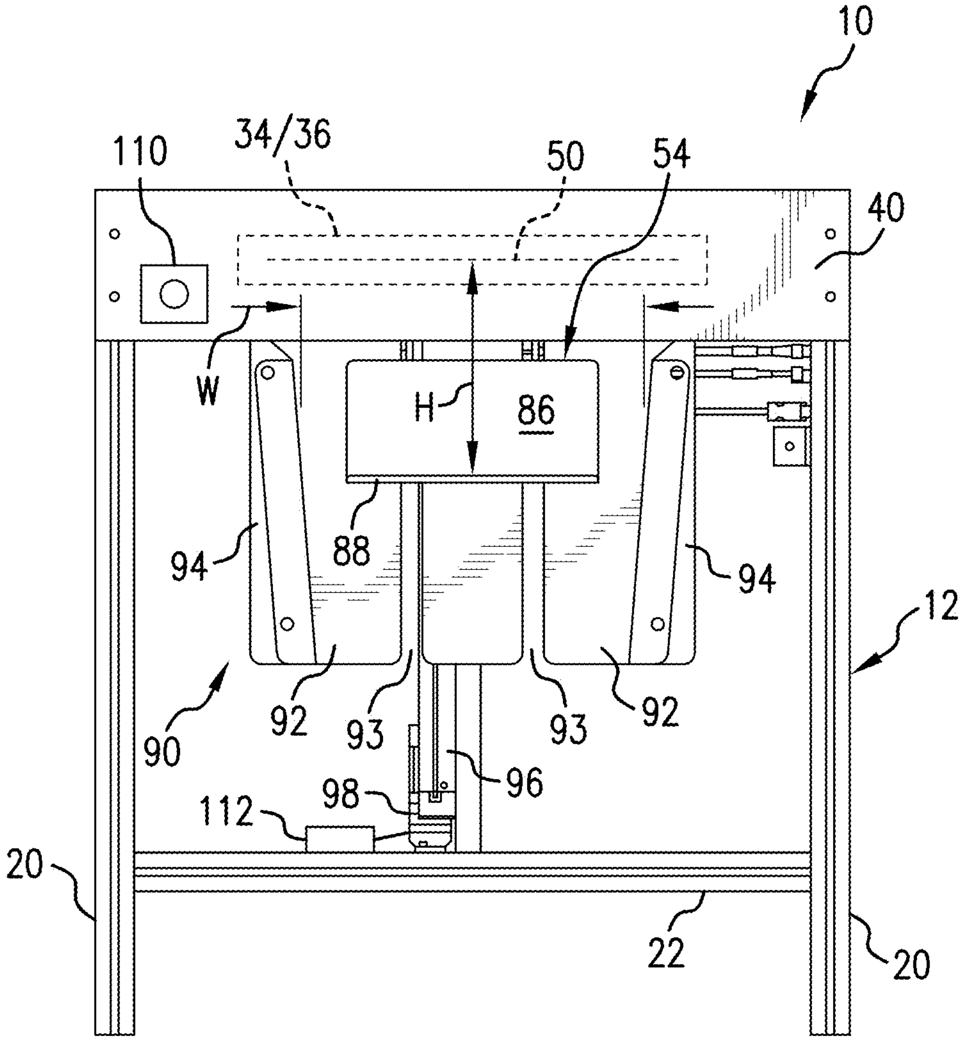
FIG. 5 is a front view of the station shown in FIGS. 1-4.
Figure 6:
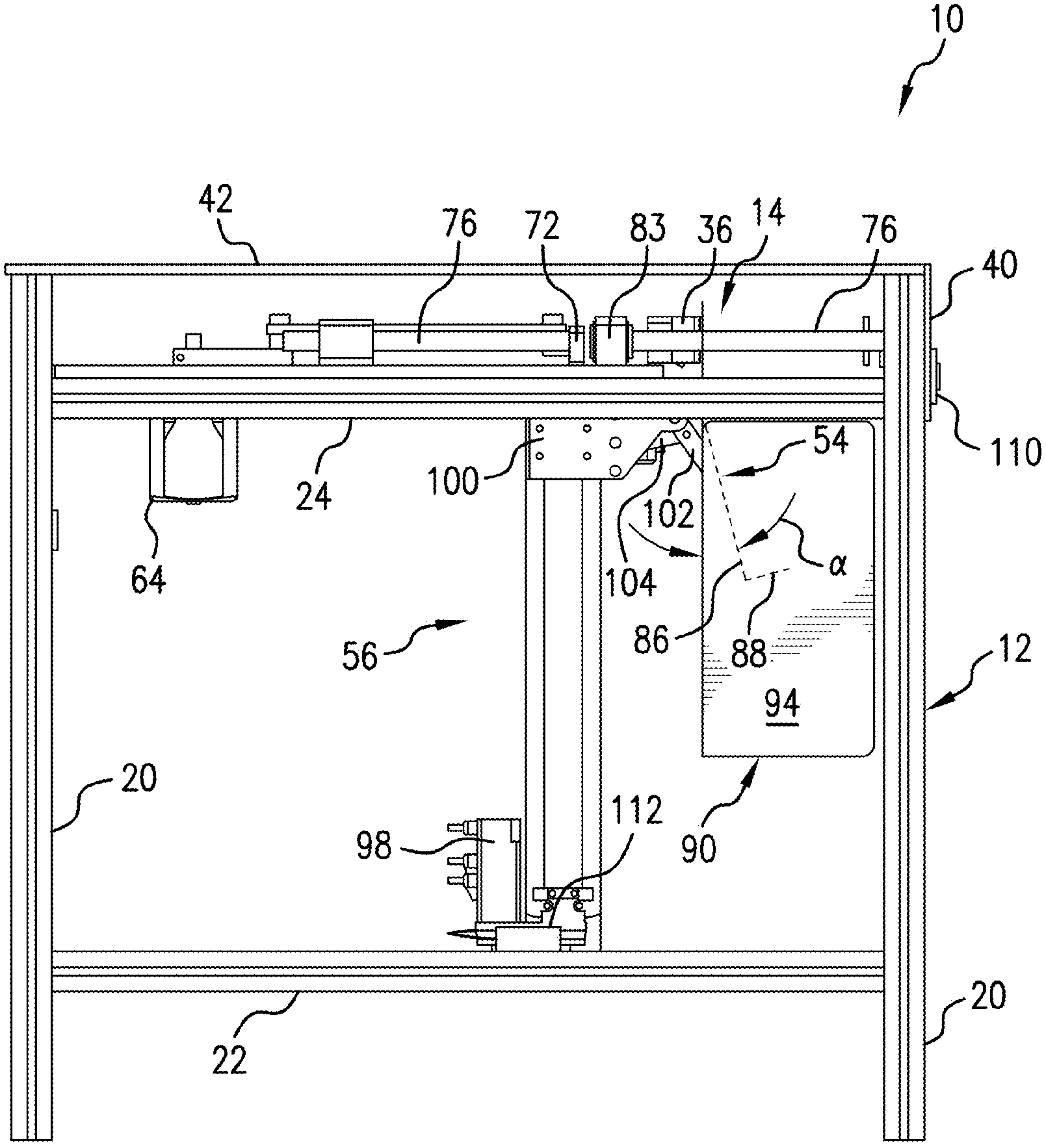
FIG. 6 is a side view of the station shown in FIGS. 1-5, depicting the sealing jaw in the open position.
Figure 7:
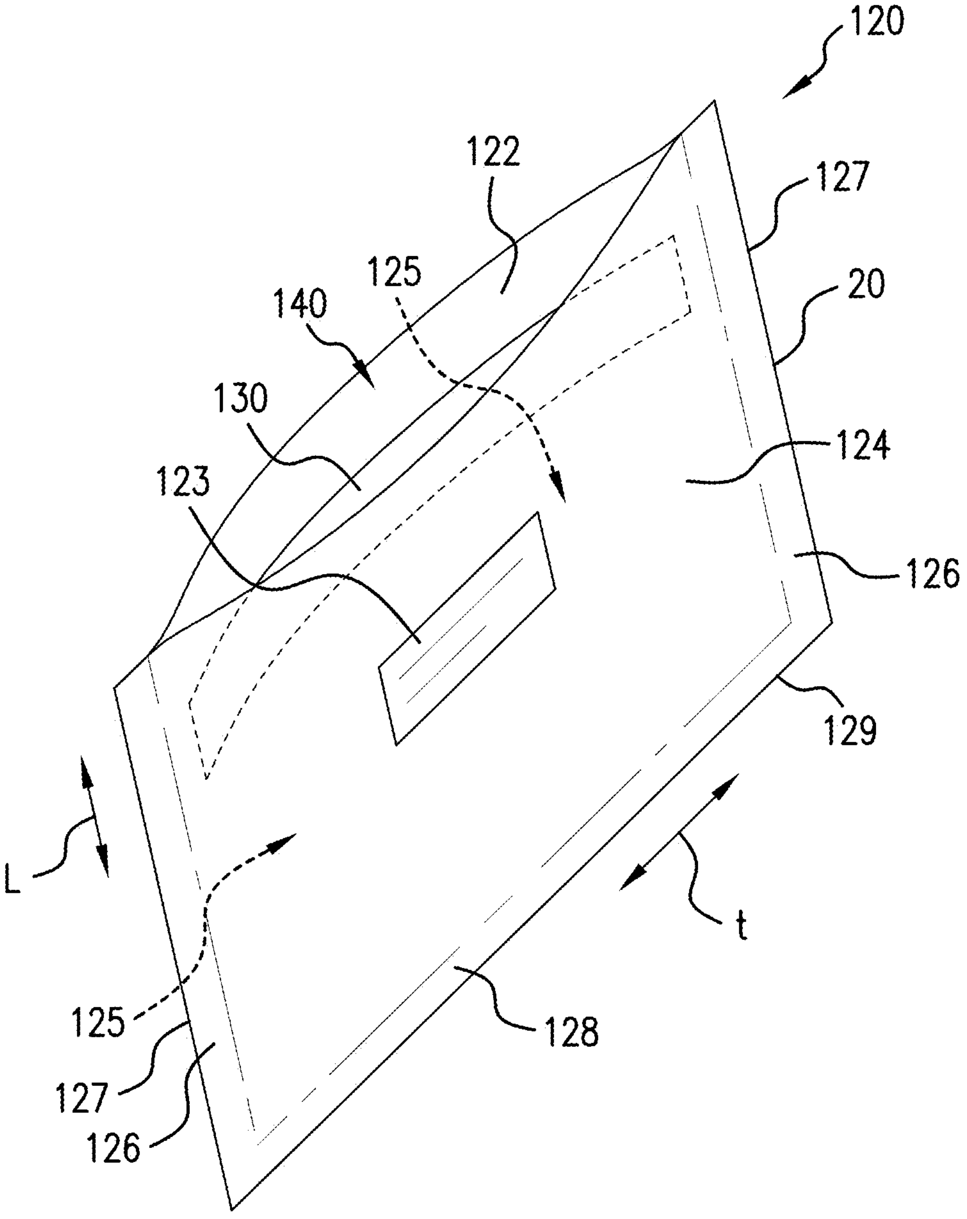
FIG. 7 is a top-front perspective view of an envelope prior to being loaded, and prior to being sealed by the station shown in FIGS. 1-6.
Figure 8:
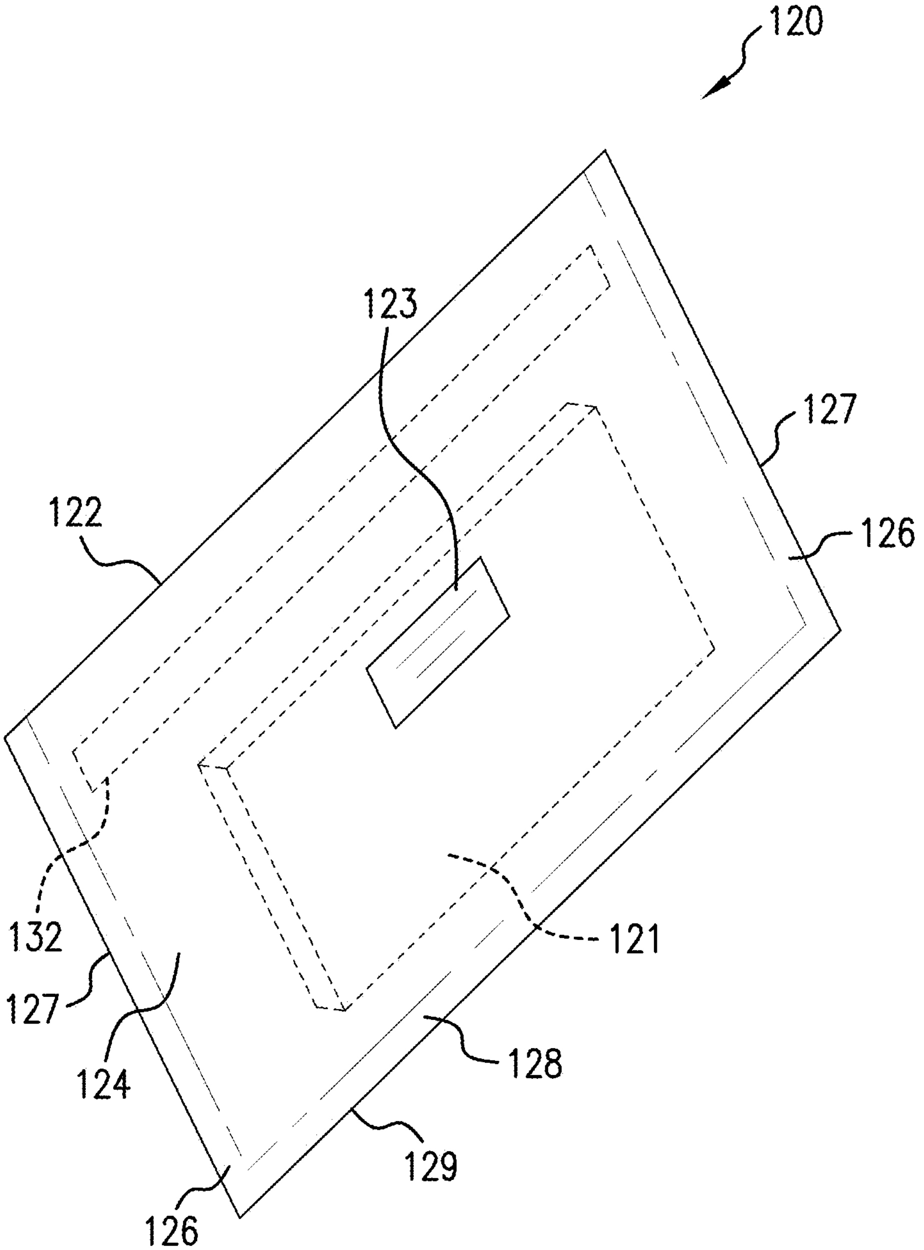
FIG. 8 is a top-front perspective view of the envelope shown in FIG. 7, after being loaded, and after being sealed by the station shown in FIGS. 1-6.

FIGS. 1-6 depict a station 10 for forming heat seals in envelopes 120. The envelopes 120 are configured to contain and hold an item to be packaged 121, typically enclosing the item 121, while the item 121 is being mailed or shipped, or otherwise needs to be packaged in a closed container. One of the envelopes 120 is depicted in FIGS. 4, 7, and 8. The item 121 is depicted in phantom in FIG. 8.

Packaging containers can include parcel packaging and other containers to package items. Packaging containers are configured to contain and hold an item, typically enclosing the item, during shipping or storage of the item. Parcel packaging is configured for shipping and/or storing products, such as for storage in warehouse or retail shelves and displays. Examples of parcel packaging include flexible shipping containers such as envelopes, which can have varying degrees of flexibility and typically are used to ship or mail small or relatively flat items or smaller items around which the walls of the envelope can conform. Flexible shipping containers such as envelopes can be padded or non-padded, can be made of materials such as paper and flexible cardboard, can be configured with or without sidewalls or gussets, and can include larger envelopes such as mailers. Examples of parcel packaging also include bags, such as paper or poly bags, which can have a self-sealing capability and are typically used to ship small to medium-sized items; boxes, which can be formed from paperboard, cardboard, wood, or plastic, and typically have a rigid or semi-rigid structure suitable for holding medium to large-size items and heavier items; and shipping tubes or tube mailers, typically used to ship documents and paper items.

The term “envelope,” as used herein, is intended to encompass, without being limited to, flat shipping containers, including mailers, typically used to ship or mail smaller items and having sufficient flexibility so as to expand and bend around the item 121 upon insertion of the item 121 into a pocket within the envelope 120; and in which the sidewalls or thickness of the container are substantially smaller than, e.g., less than 1/100th (one percent) of, the width and/or height of the container.

The following details of the envelope 120 are provided for illustrative purposes only. The station 10 can be used to seal envelopes having other configurations, including envelopes having a foldable flap that covers the opening to the interior pocket of the envelope after the item 121 has been inserted into the envelope; and envelopes having double-ply walls with, or without padding, insulating, and/or expandable material disposed between the plies of the walls.

Referring to FIGS. 7 and 8, the envelope 120 comprises an envelope body that includes a wall 122 and an opposing wall 124. The walls 122, 124 are formed from paper, and define an internal containment area or envelope pocket 125 that receives the item 121. The paper can be regular kraft paper, extensible paper, or other types of paper. For example, in some applications, the walls 122, 124 can be formed from kraft paper having a weight within the range of about 90 grams per square meter to about 130 grams per square meter. The walls 122, 124 can be formed from materials other than paper, such as plastic film, in the alternative.

The envelope 120 also includes two inter-wall seals 126, and an inter-wall seal 128. The inter-wall seals 126, 128 are depicted in phantom in FIG. 7. The inter-wall seals 126, 128 can be formed from a bonding element in the form of an adhesive material. The inter-wall seals 126, 128 affix the walls 122, 124 to each other and define, in part, a pocket border of the envelope pocket 125. As can be seen in FIG. 7, each inter-wall seal 126 is located along a respective side edge 127 of the envelope 120 and extends continuously in a longitudinal direction of the envelope 120, along the entire length of the side edge 127. The longitudinal direction is denoted in FIG. 7 by the arrow "L."

The inter-wall seal 128 extends continuously along the bottom edge 129 of the envelope 120, in a transverse direction, i.e., in a direction substantially perpendicular to the longitudinal direction, and intersects the inter-wall seals 126. The transverse direction is denoted in FIG. 7 by the arrow "T."

The walls 122, 124, after being affixed to each other in the above manner, define an opening 140 to the envelope pocket 125. As can be seen in FIG. 7, the opening 140 is located at the top of the envelope 120 and permits the item to be packaged 121 to be inserted into the envelope pocket 125. More specifically, the wall 124 overlies the wall 122 and is affixed to the wall 122 about at least a portion of a pocket border defined by the inter-wall seals 126, 128, with the pocket border enclosing the envelope pocket 125 defined between the walls 122, 124, and with at least one of the walls 122, 124 defining the opening 140 which allows access to the envelope pocket 125 from an exterior of the envelope 120 for loading the item 121 into the envelope pocket 125, when the envelope 120 is unsealed as depicted in FIG. 7.

Referring to FIG. 7, a sealable member 130 is disposed on an inwardly facing surface of the wall 122, i.e., on the surface of the wall 122 that faces the wall 124, proximate the upper end of the wall 122. The sealable member 130 can be, for example, a heat sealable material or a hot-melt adhesive that, upon being heated and pressed, forms a closure seal 132 that adheres the wall 124 to the wall 122. The closure seal 132 thus maintains the opening 140 in a closed state. Also, the closure seal 132 forms another portion of the pocket border, so that the pocket border completely circumscribes the envelope pocket 125 to retain the item 121 within the envelope pocket 125. The closure seal 132 is depicted in FIG. 8, which shows the loaded envelope 120 after being sealed by the station 10. Thus, prior to formation of the closure seal 132, the envelope pocket 125 is closed on three sides and open on the fourth side, with the fourth side being closed upon formation of the closure seal 132.

The sealable member 130 can be disposed on the wall 124 in alternative embodiments. In other alternative embodiments, a sealable member 130 can be disposed on each of the walls 122, 124.

The sealable member 130 is a heat-activatable material. The heat-activatable material from which the sealable member 130 can be formed can be, for example, a heat sealable material or a hot-melt adhesive that, upon being heated and pressed, forms a closure seal (not shown) that adheres the wall 124 to the wall 122. The sealable member 130 can be a pressure-sensitive adhesive, a cold glue, a cohesive material, or other type of sealing material in alternative embodiments.

A heat seal may be formed between the same or similar types of thermoplastic materials by subjecting the materials to heat and pressure sufficient to weld the materials to each other. In the case of paper substrates to be fixed to each other, a heat sealable material may be applied to each of the substrates. At the time the substrates are to be fixed, the heat sealable material on one or both of the substrates is subject to heat and pressure sufficient to weld the heat sealable materials together, thereby fixing the paper substrates to each other.

Hot-melt adhesives are thermoplastic polymers that are solid at room temperature, become molten when heated to an activation temperature above their softening point, and resolidify upon loss of heat at a temperature below a solidifying point, which may be the same as or different than the activation temperature, increasing in strength as they re-solidify. Most hot-melt adhesives, upon melting into a molten state and re-solidifying, do not undergo any chemical reaction such as cross-linking or removal of a carrier, e.g., evaporation of water. Thus, hot-melt adhesives typically can be reactivated, i.e., re-melted and re-solidified, after initially being applied to a substrate.

The hot-melt adhesive, after being applied to the surface to be bonded, can be in a low-tackiness state in which it has a low, or no tackiness in a lower range of temperatures. The hot-melt adhesive is reactivatable. More specifically, the hot-melt adhesive is applied hot, and cools and cures in the converting process. The hot-melt adhesive is reactivated by re-heating the hot-melt adhesive up to an activation temperature within a lower range of temperatures. This lower range of application temperatures in some embodiments, for example, is below about 140° F. In other embodiments, for example, the lower range of temperatures is below about 120° F., below about 125° F., or below about 130° F.

The heating of the hot-melt adhesive to the activation temperature causes the hot-melt adhesive to become molten. The subsequent cooling of the hot-melt adhesive, in combination with the application of pressure, causes the hot-melt adhesive to bond to the opposing surface, forming a seal between the surfaces.

Referring to FIGS. 1-6, the station 10 includes a base 12, a sealing mechanism 14, and an actuator mechanism 16. The sealing mechanism 14 and the actuator mechanism 16 are mounted on the base 12. The base 12 thus supports the sealing mechanism 14 and the actuator mechanism 16 and elevates the sealing mechanism 14 and the actuator mechanism 16 above the floor or other supporting surface on which the station 10 is positioned.

The base 12 has a generally rectangular configuration, when viewed from above as shown in FIG. 3. The base 12 includes four legs 20, four lower cross members 22, and four upper cross members 24. Each lower cross member 22 has a substantially horizontal orientation and is connected to and extends between two respective legs 20. Each upper cross member 24 likewise has a substantially horizontal orientation and is connected to and extends between two respective legs 20.

The base 12 further includes a lower platform 26, and an upper platform 28. The lower platform 26 is supported by, and is connected the lower cross members 22, proximate the respective lower ends of the legs 20. The lower platform 26 has an opening 30 formed therein and located proximate a forward end of the lower platform 26. The forward direction is denoted by the arrow 31 in FIG. 1.

The upper platform 28 is supported by and is connected to three of the upper cross members 24, proximate the respective upper ends of the legs 20. The upper platform 28 is spaced from the forward end of the base 12, as can be seen in FIG. 3.

Specific details of the base 12 are presented for illustrative purposes only. The base 12 can have other configurations in alternative embodiments. For example, alternative embodiments of the base 12 can have a square or other shape when viewed from above. Other alternative embodiments can include more, or less than four legs 20, and more, or less than eight cross members 22, 24. Other alternative embodiments can include cross members 22, 24 disposed in non-horizontal orientation. In other alternative embodiments, the base 12 can be formed without legs 20 and/or without cross members 22, 24. For example, each side of the base 12 can be formed from a continuous sheet of metal, wood, or other suitable material in alternative embodiments.

Other alternative embodiments of the station 10 can be configured without any base 12. In such embodiments, for example, the station 10 can be placed on a desk, a table, or another elevated structure, or the station 10 can be suspended from a wall or other surface.

Referring to FIG. 1, the station 10 also includes a front guard plate 40, and a cover 42. The front guard plate 40 has a substantially vertical orientation. The front guard plate 40 extends between and is connected to the two legs 20 located at the forward end of the base 12, and is located proximate the respective upper ends of those legs 20.

The cover 42 has a substantially horizontal orientation. The cover 42 is disposed on, and is connected to the respective upper ends of the legs 20. The cover 42 has a rectangular opening 44 formed therein, proximate the forward end of the cover 42. Alternative embodiments can be formed without one, or both of the front guard plate 40 and the cover 42.

In addition to partially isolating the sealing mechanism 14 and the actuator mechanism 16 from the user, the upper surface of the cover 42 can act as a working surface on which one or more envelopes 120, and one or more of the items 121 can rest before, during, and after the envelopes 120 are loaded by the user. In some embodiments, the envelopes 120 can be arranged as one or more flights of envelopes mounted on a wicket that is supported by the upper surface of the cover 42. The station 10 thus can act as an individual workstation that facilitates loading and sealing of the envelopes 120. In some embodiments, the cover 42 can have a width, or side to side dimension, of at least about two feet; and a depth, or front to back dimension, of at least about two feet. In other embodiments, the cover 42 can have a width of between about two feet and about five feet, and a depth between about two feet and about five feet. The cover 42 can have other dimensions in alternative embodiments. In other embodiments, two or more sealing mechanisms 14 and two or more actuator mechanisms 16 can be mounted on a single base 12 to produce a multi-station workstation.

In some embodiments, the base 12 can be configured to elevate the upper surface of the cover 42 by about two feet to about five feet above the supporting surface on which the base 12 rests. The base 12 can be configured to elevate the upper surface of the cover 42 to other heights above the supporting surface, in alternative embodiments.

The sealing mechanism 14 is configured to form the closure seal 132 in the envelope 120. The sealing mechanism 14 includes a first sealing member in the form of a front sealing jaw 34, and a second sealing member in the form of an anvil or rear sealing jaw 36, as shown in FIGS. 2-4. The actuator mechanism 16 is configured to move the front sealing jaw 34 horizontally, toward and away from the rear sealing jaw 36, so that heat and pressure are applied to the sealable member 130 of the envelope 120, resulting in the formation of the closure seal 132 that seals the envelope pocket 125 closed.

The front and rear sealing jaws 34, 36 each include a respective heating element 50. In alternative embodiments, only one of the front and rear sealing jaws 34, 36 can be equipped with a heating element 50. The heating element 50 can be, for example, a heated wire. Other types of heating techniques, such as a radiative heating or heated air, can be used in lieu of a heated wire in alternative embodiments.

Referring to FIGS. 2-3, the sealing mechanism 14 further includes a sealing guard 55 mounted to the rear sealing jaw 36. The sealing guard 55 is configured to translate in relation to the rear sealing jaw 36 and the heating element 50 between an extended position shown in FIG. 3, and a retracted position (not shown). The sealing guard 55 partially encloses and covers the heating element 50 and the heated surface of the rear sealing jaw 36 when the sealing guard 55 is in the first position, to help prevent the operator or other individuals from inadvertently contacting the heating element 50 or the heated surface of the rear sealing jaw 36. The sealing guard 55 is biased toward its extended position by springs (not shown) or other suitable devices.

The sealing guard 55 has a sealing guard slot (not shown) configured to provide access to the sealable member 130 of the envelope 120, the heating element 50, and the heated surface of the rear sealing jaw 36. The sealing guard 55 is configured to move from its extended position to its retracted position as the front sealing jaw 34 pushes the sealing guard 55 in the rearward direction as the front sealing jaw 34 approaches its partially-closed position. The retraction of the sealing guard 55 permits the front sealing jaw 34 to contact the sealable member 130 of the envelope 120, which is exposed by way of the sealing guard slot, and to push the sealable member 130 into contact with the heating element 50 and the heated surface of the rear sealing jaw 36. The springs of the sealing guard 55 are weaker than the springs 52 of the rear sealing jaw 36, so that the sealing guard 55 begins retracting upon coming into contact with the advancing front sealing jaw 34. In alternative embodiments where the front sealing jaw 34 includes the heating element 50, the sealing guard 55 can be provided in the substantially the same manner. The sealing guard 55 can be provided to either the front sealing jaw 34, the rear sealing jaw 36, or both the front and rear sealing jaws 34, 36.

The above details of the sealing guard 55 are presented for illustrative purposes only. The sealing guard 55 can have other configurations in alternative embodiments. In other alternative embodiments, the sealing mechanism 14 can be configured without a sealing guard.

The station 10 also includes a spacer and a positioning surface. The spacer is configured to position the first and second sealing members at a predetermined first distance from the positioning surface. The predetermined first distance can correspond to a spacing between a closed bottom 129 of the envelope 120 and the sealable member 130 to align the sealable member 130 with the first and second sealing members when the envelope 120 is positioned against the positioning surface. The positioning surface also acts as an envelope support surface configured to support the envelope 120. In alternative embodiments, the positioning surface and the envelope support surface can be different surfaces.

In some embodiments, the spacer and the positioning surface can be part of a shelf configured to support and position the envelope 120. For example, referring to FIG. 3, the station 10 can include a shelf 54 comprising a back portion 86 and a lip 88 that adjoins the back portion 86. As depicted in FIG. 3, an upper surface of the lip 88 acts as the positioning surface (and the envelope support surface), and the back portion 86 of the shelf 54 acts as the spacer. The station 10 also includes a shelf support mechanism 56 mounted on the lower platform 26 of the base 12, as shown in FIGS. 5 and 6. The shelf 54 is mounted on an upper end of the shelf support mechanism 56. The shelf 54 is located directly below the opening 44 in the cover 42 of the base 12. Also, the shelf 54 is located directly above the opening 30 in the lower platform 26.

The item 121 can be loaded into the envelope 120 manually, or on an automated basis. Once the item 121 has been loaded, as depicted in FIG. 8, the envelope 120 can be positioned on the shelf 54 by the operator. In alternative embodiments, the station 10 can be equipped with, or can be used in conjunction with automated equipment that permits the envelope 120 to be positioned on the shelf 54 on an automated basis. As discussed below, the shelf support mechanism 56 is configured to permit the height, or vertical position of the shelf 54 to be adjusted in relation to the sealing mechanism 14, so that the upper portion of the envelope 120, which includes the sealable member 130, is positioned between the front and rear sealing jaws 34, 36.

The envelope 120 can be placed on the shelf 54 from above, by lowering the envelope 120 through the opening 44 in the cover 42 while the front sealing jaw 34 is in an open position of the front sealing jaw 34 (discussed below). The station 10 is configured so that the shelf 54 is elevated above the floor or other supporting surface on which the station 10 is positioned. For example, the station 10 can be configured so that the generally upward-facing surface of the lip 88 of the shelf 54 is positioned about two feet to about four feet above the supporting surface, allowing the user to easily load the envelope 120 on the shelf 54 while the user is standing in an upright position next to the station 10. The base 12 can be configured to elevate the shelf 54 to other heights above the supporting surface, in alternative embodiments.

Once the envelope 120 has been positioned on the shelf 54, a sealing cycle can commence automatically, or in response to an input provided by the operator by way of a push button or other suitable input device 110, depicted schematically in FIG. 1. Upon commencement of the sealing cycle, the front sealing jaw 34 is moved by the actuator mechanism 16 toward the rear sealing jaw 36 and to a closed position of the front sealing jaw 34, so that the upper portion of the envelope 120, including the sealable member 130, becomes sandwiched between the front and rear sealing jaws 34, 36 as shown in FIG. 4. The upper portion of the envelope 120, including the sealable member 130, is heated by the heating elements 50 upon coming into contact with the front and rear sealing jaws 34, 36. The combination of heat and pressure applied to the envelope 120 by the front and rear sealing jaws 34, 36 causes the sealable member 130 to form the closure seal 132 that seals the top of the envelope 120.

The optimal values for the sealing parameters, e.g., the sealing temperature, sealing pressure, and dwell time, are application-dependent and can vary with factors such as the desired strength, e.g., the desired peel strength, of the closure seal 132; the type of material from which the walls 122, 124 are formed; the thickness of the walls 122, 124; the properties of the sealable member 130, etc. In some embodiments, the station 10 can be configured to automatically set the sealing parameters to predetermined values based on inputs such as the type of material from which the walls 122, 124 are formed, the type of sealable member 130 on the envelope 120, etc.

For example, in some applications in which the walls 122, 124 are formed formed paper, the dwell time can be about 0.25 second to about 1.5 seconds, the sealing temperature can be about 300° F. to about 380° F., and the sealing pressure can be about 200 psi or less. These values are presented for illustrative purposes only. The dwell time, sealing temperature, and sealing pressure can have other values in other applications. In some applications, the peel strength and/or the hot tack strength of the closure seal 132 be about 1 pound per linear inch to about 4 pounds per linear inch. These values are presented for illustrative purposes only. The peel strength and the hot tack strength have other values in other applications.

After the front and rear sealing jaws 34, 36 have remained in contact with the envelope 120 for a period of time sufficient to form the closure seal 132, the front sealing jaw 34 is moved away from the envelope 120 and the rear sealing jaw 36. Once the front sealing jaw 34 has been withdrawn to its open position, the shelf support mechanism 56 tilts the shelf 54 so that the sealed envelope 120 falls off of the shelf. The envelope 120 subsequently falls through the opening 30 in the lower platform 26 and can drop onto a conveyor 60 positioned below the opening 30. The conveyor 60 can move the envelope 120 in the direction denoted by the arrows 61 in FIG. 1. The conveyor 60 can transport the envelope 120, for example, to a centralized shipping or storage location. Alternatively, the sealed envelope 120 can drop into a box or container positioned below the opening 30, for collection with other sealed envelopes 120.

In applications in which the sealable member 130 is not heat-activatable, the controller 112 can prevent the heating element 50 from being activated during the sealing process, i.e., the closure seal 132 can be formed solely by the pressure applied to the envelope 120 by the front and rear sealing jaws 34, 36.

In alternative embodiments, the station 10 can include provisions, such as a blower, a movable arm, a spring, etc., that can blow, push, or otherwise eject the envelope 120 from the shelf 54, in lieu of, or in addition to tilting the shelf 54.

Referring to FIGS. 3 and 6, the actuator mechanism 16 includes a motor 64. The motor 64 is mounted on an underside of the upper platform 28 of the base 12. The motor 64 comprises a shaft 66 that extends upward, through an opening in the upper platform 28. The shaft 66 rotates in response to the torque generated by the motor 64 when the motor 64 is activated. The motor 64 can be, for example, a servo motor. Other types of motors, such as a stepper motor, can be used in the alternative.

The actuator mechanism 16 also includes a rotating arm or crank 68 and a linkage 70. As can be seen in FIG. 3, a first end of the crank 68 is connected to the shaft 66 of the motor 64, so that the crank 68 is rotated by the motor 64 when the motor 64 is activated. A second end of the crank 68 is coupled to a first end of the linkage 70 by a pin or other suitable structure, so that the linkage 70 can pivot in relation to the crank 68, as denoted by the arrow 79 in FIG. 4.

Referring to FIGS. 2-4, the actuator mechanism 16 further includes a second actuator member in the form of a rear actuator bar 72, a first actuator member in the form of a front actuator bar 74, and two guide arms 76. The rear actuator bar 72 is coupled to a second end of the linkage 70 by a pin or other suitable structure, so that the linkage 70 can pivot in relation to the rear actuator bar 72, as denoted by the arrow 79 in FIG. 4.

Each guide arm 76 is configured as a rod having a cylindrical cross section. The guide arms 76 can have other configurations in alternative embodiments. Each guide arm 76 extends through a respective aperture located proximate a respective lengthwise end of the rear actuator bar 72. The guide arms 76 are connected to the rear actuator bar 72, at a location on each guide arm 76 proximate the lengthwise mid-point of the guide arm 76. The guide arms 76 thus translate with the rear actuator bar 72 in the horizontal direction, as indicated by the arrows 78 in FIGS. 3 and 4.

A forward end of each guide arm 76 is connected to the front actuator bar 74, proximate a respective side or end portion of the front actuator bar 74, so that horizontal movement of the rear actuator bar 72 in the forward and rearward directions imparts a corresponding movement to the front actuator bar 74 via the guide arms 76.

The actuator mechanism 16 also includes two stationary guides 80. The stationary guides 80 are mounted on the upper surface of the upper platform 28 of the base 12, at respective locations about halfway between the front and rear edges of the upper platform 28, as can be seen in FIGS. 2-4. Each stationary guide 80 defines an aperture configured to receive a respective one of the guide arms 76. The guide arms 76 extend through their associated stationary guides 80 by way of the apertures. Each stationary guide 80 supports, guides, and laterally restrains its associated guide arm 76, while allowing the guide arm 76 to move in relation to the stationary guide 80 in the forward and rearward directions.

The actuator mechanism 16 also includes a stationary guide bar 83. The stationary guide bar 83 is mounted on the upper surface of the upper platform 28 of the base 12, proximate the forward end of the upper platform 28. The stationary guide bar 83 thus is located between the rear actuator bar 72 and the front actuator bar 74. The stationary guide bar 83 has two apertures formed therein proximate the respective sides of the stationary guide bar 83. A bushing is disposed within each respective aperture of the stationary guide bar 83. Each bushing receives a respective one of the guide arms 76, so that the guide arms 76 pass through, and can translate linearly in relation to the stationary guide bar 83. The stationary guide bar 83 supports, guides, and laterally restrains the guide arms 76, while allowing the guide arms 76 to move in the forward and rearward directions, i.e., in the directions denoted by the arrows 78, in relation to the stationary guide bar 83.

Referring to FIG. 3, the rear sealing jaw 36 is suspended from the stationary guide bar 83 by posts 51 that extend from the forward-facing side of the stationary guide bar 83. The rear sealing jaw 36 is biased in the forward direction by springs 52 positioned between the rear sealing jaw 36 and the stationary guide bar 83. The rear sealing jaw 36 is restrained from movement in the forward direction by fasteners 53 or other suitable structures that extend between the stationary guide bar 83 and the rear sealing jaw 36. The fasteners 53, in conjunction with the springs 52, facilitate adjustment of the position of the rear sealing jaw 36 in relation to the stationary guide bar 83 and the shelf 54.

The crank 68 and the linkage 70 act together as a cranking mechanism that produces a reciprocating movement in the rear actuator bar 72, which in turn causes the front sealing jaw 34 to move between its open and closed positions. In particular, the rotational movement of the crank 68 in response to the activation of the motor 64 causes the crank 68 to exert a force on the linkage 70. The force is transmitted to the rear actuator bar 72 by way of the linkage 70 and causes the rear actuator bar 72 to move in the forward or rearward directions, depending on the relative positions and orientations of the crank 68 and the linkage 70.

FIGS. 1-3 and 6 depict the sealing mechanism 14 and the actuator mechanism 16 at the start of a sealing cycle. The front sealing jaw 34 is in the open, or forward position at which the front sealing jaw 34 is maximally spaced from the rear sealing jaw 36, so that the top of the envelope 120 can be positioned between the front and rear sealing jaws 34, 36. The front and rear sealing jaws 34, 36 define an opening 59, shown in FIG. 3, configured to receive the envelope 120. The opening 59 can have a depth about equal to the spacing between the front and rear sealing jaws 34, 36, and a width least two times greater than the depth of the opening 59. The opening 59 can have other relative dimensions in alternative embodiments.

The crank 68 is in the 3:00 o'clock position, from the perspective of FIG. 3, so that the lengthwise axis of the crank 68 is aligned with the lengthwise axis of the linkage 70, and the linkage 70 is positioned directly between the crank 68 and the rear actuator bar 72, with minimal overlap between the linkage 70 and the crank 68. This configuration causes the rear actuator bar 72 to assume its forward-most position, at which the rear actuator bar 72 is maximally spaced from the motor 64 and minimally spaced from the stationary guide bar 83.

As the crank 68 of the motor 64 rotates in a clockwise direction from the position depicted in FIG. 3 by about 90 degrees (not shown), the linkage 70, and the attached rear actuator bar 72, move rearward. The lateral restraint of the guide arms 76 and the rear actuator bar 72 by the stationary guides 80 and the stationary guide bar 83 causes the rear actuator bar 72 to move linearly, in the rearward direction. Also, the lengthwise axes of the crank 68 and the linkage 70 no longer are aligned, and the spacing between the motor 64 and the rear actuator bar 72 no longer is at its maximum. The rearward movement of the rear actuator bar 72, and the corresponding rearward movement of the guide arms 76 and the front actuator bar 74, draw the front sealing jaw 34 rearward, toward the rear sealing jaw 36 and the envelope 120.

As the crank 68 rotates further in the clockwise direction from the position shown in FIG. 3, the linkage 70, and the attached rear actuator bar 72, move further rearward, to the respective positions shown in FIG. 4. At this point, the lengthwise axes of the crank 68 and the linkage 70 are aligned, with the linkage 70 completely overlapping the crank 68. The spacing between the motor 64 and the rear actuator bar 72 is at its minimum, and the rear actuator bar 72 is at its rearward-most position.

As can be seen in FIG. 4, the rearward movement of the rear actuator bar 72, and the corresponding rearward movement of the guide arms 76, has drawn the front actuator bar 74 rearward, which in turn has drawn the attached front sealing jaw 34 to its rearward or closed position. The front sealing jaw 34, when in the closed position, contacts the upper portion of the envelope 120 and urges the upper portion of the envelope 120 into the rear sealing jaw 36.

At this point, the upper portion of the envelope 120, including the sealable member 130, is sandwiched between, and is being pressed and heated by the front and rear sealing jaws 34, 36 as shown in FIG. 4. The rear sealing jaw 36, which is secured to the upper platform 28 of the base 12 by way of the stationary guide bar 83, has remained stationary in relation to the front sealing jaw 34, and thus exerts a reactive force on the upper portion of the envelope 120 as the upper portion of the envelope 120 is pressed against the rear sealing jaw 36 by the front sealing jaw 34. As discussed above, the heat and pressure applied to the upper portion of the envelope 120 by the front and rear sealing jaws 34, 36 forms the closure seal 132 from the sealable member 130.

The above description of the actuator mechanism 16 is presented for illustrative purposes only. The actuator mechanism 16 can have other configurations in alternative embodiments of the station 10. For example, a vertically-oriented actuator mechanism can be used in alternative embodiments.

In alternative embodiments, the rear sealing jaw 36 can be configured to move toward the front sealing jaw 34 to effect the above-noted sealing operation. In such embodiments, the front sealing jaw 34 can be configured to move toward the rear sealing jaw 36 in the above-described manner. Alternatively, the front sealing jaw 34 can be configured to remain stationary as the rear sealing jaw 36 urges the upper portion of the envelope 120 into the front sealing jaw 34.

The station 10 can include a controller 112, depicted schematically in FIG. 1, that is configured to activate the motor 64 in response to a user input, when the user wishes to initiate the sealing cycle. In addition, or in the alternative, the controller 112 can be configured to activate the motor 64 automatically, in response to a sensor input indicating the presence of an envelope 120 on the shelf 54.

The motor 64, once activated at the start of a sealing cycle, causes the crank 68 to rotate continuously between the positions shown in FIGS. 3 and 4, so that the first sealing jaw 34 is driven continuously from its open position to its closed position. The controller 112 causes the motor 64 to stop, i.e., deactivate, when the first sealing jaw 34 reaches its closed position shown in FIG. 4. The motor 64 remains deactivated for a sufficient period of time to allow the front and rear sealing jaws 34, 36 to apply sufficient heat and pressure to the envelope 120 to form the closure seal 132 from the sealable member 130. Once this period of dwell time has elapsed, the motor 64 is reactivated by the controller 112. Upon reactivation, the motor 64 causes the crank 68 to rotate in a clockwise direction from the perspective of FIG. 3. The additional clockwise rotation of the crank 68 drives the linkage 70, the rear actuator bar 72, the guide arms 76, and the front actuator bar 74 back to their respective original positions shown in FIG. 3, with the noted components moving in a reverse or opposite manner from their respective movements during the initial portion of the sealing cycle. The additional clockwise rotation of the crank 68, and the resulting movement of the linkage 70, the rear actuator bar 72, the guide arms 76, and the front actuator bar 74, cause the front sealing jaw 34 to return to its open position.

At this point, the sealed envelope 120 can be removed from the station 10 as discussed above, another envelope 120 can be placed on the shelf 54, and another sealing cycle can be commenced.

In alternative embodiments, the actuator mechanism 16 can have a configuration other than the crank mechanism described above. For example, a linear actuator or other suitable device or mechanism, driven electrically, pneumatically, hydraulically, or otherwise, can be used in lieu of the motor 64, the crank 68, and the linkage 70 to impart the above-noted movement to the rear actuator bar 72.

As can be seen in FIGS. 3 and 5, the shelf 54 includes a back portion 86, and a lip 88 the adjoins the back portion 86. The back portion 86 and the lip 88 can be angled in relation to each other by about 90 degrees or more. For example, the back portion 86 and the lip 88 can angled in relation to each other by about 90 to about 120 degrees. The shelf 54, in its non-tilted position, is oriented such that the back portion 86 is inclined rearward, as indicated by the angle "$\alpha$" depicted in FIG. 6. The value of $\alpha$, can be, for example, about 5 degrees to about 30 degrees in relation to the vertical. Thus, the envelope 120, when placed on the shelf 54 with the lower edge of the envelope 120 resting on the lip 88, is restrained from downward movement by the lip 88. The envelope 120 remains supported by the back portion 86 and the lip 88 as the front and rear sealing jaws 34, 36 engage the upper portion of the envelope 120 and form the closure seal 132, as discussed above.

The above description of the shelf 54 is presented for illustrative purposes only. The shelf 54 (or other structures that provide the spacer, the positioning surface, and the envelope support surface) can have other configurations in alternative embodiments. For example, the shelf 54 can be a substantially planar square or rectangular platform in alternative embodiments. In other alternative embodiments, the shelf 54 can include a concave surface configured to support the envelope 120. In other alternative embodiments, the shelf 54 can be formed by one or more bars, rods, pads, nets, etc.

The station 10 also includes a lateral guide configured and positioned with respect to the sealing mechanism 14 and the spacer. The lateral guide directs and orients the envelope 120 laterally into contact with the positioning surface. For example, the station 10 can include a lateral guide in the form of sidewalls 94.

Referring to FIGS. 5 and 6, the station 10 also includes a shelf guide 90 comprising a back portion 92 and the sidewalls 94. The sidewalls 94 adjoin opposite ends of the back portion 92. The shelf guide 90 is suspended from the underside of the upper platform 28 of the base 12, so that the shelf guide 90 partially surrounds the shelf 54, with the sidewalls 94 disposed on opposite sides of the shelf 54.

The sidewalls 94 are tilted inwardly as they extend downward, so that the sidewalls 94 produce a centering effect on the envelope 120 as the envelope 120 is placed on the shelf 54, i.e., the sidewalls 94 are configured to center the envelope 120 with respect to the first and second sealing jaw 34, 36. Alternative embodiments the shelf guide 90 can be configured so that the spacing between the sidewalls 94, represented by the symbol "W" in FIG. 5, can be adjusted to accommodate envelopes 120 of different widths.

Referring to FIGS. 5 and 6, the shelf support mechanism 56 includes a mounting column 96, and an actuator 98 communicatively coupled to the controller 112. The mounting column 96 and the actuator 98 are mounted on the lower platform 26 of the base 12. The mounting column 96 can have a telescoping configuration. In particular, the mounting column 96 includes a stationary lower portion mounted on the lower platform 26, and an upper portion. The upper portion is positioned over the lower portion and is configured to translate telescopically in relation to the lower portion. The actuator 98 is connected to the upper portion by cabling or other suitable hardware that allows the actuator 98 to raise and lower the upper portion in relation to the lower portion.

The shelf 54 is coupled to the upper portion of the mounting column 96, so that the shelf 54 can be raised and lowered by the actuator 98, in response to user input to the controller 112. The user input can be provided via the input device 110.

Details of the mounting column 96 are presented for illustrative purposes only. The shelf 54 can be raised and lowered by structures and devices having other configurations in alternative embodiments. For example, the shelf 54 can be disposed on vertically oriented rails that facilitate upward and downward movement of the shelf 54. In other alternative embodiments, the shelf 54 can be suspended from the underside of the upper platform 28. In other alternative embodiments, the height of the shelf 54 can be non-adjustable.

Referring to FIG. 6, the shelf support mechanism 56 also includes a mounting bracket 100 connected to the upper end of the upper portion of the mounting column 96. The shelf support mechanism 56 further includes two mounting arms 102, and an actuator 104 mounted on the mounting bracket 100 and communicatively coupled to the controller 112. A first end of each mounting arm 102 is connected to the back portion 92 of the shelf 54. A second end of each mounting arm 102 is coupled to the mounting bracket 100 by way of a pin or other suitable structure that facilitates pivoting movement of the mounting arms 102 in relation to the mounting bracket 100.

The actuator 104 is coupled to the mounting arms 102 by way of a pin or other suitable structure that facilitates pivoting movement of the mounting arms 102 in relation to the actuator 104 and the upper portion of the mounting column 96. The actuator 104 is configured to exert a pushing or pulling force on the mounting arms 102 by way of the associated pin. This force causes the mounting arms 102 to pivot about the pin 108, which in turn changes the orientation of the shelf 54.

Prior to the start of the sealing cycle, the user can adjust the height of the shelf 54 as discussed above, so that the upper portion of the envelope 120, which includes the sealable member 130, aligns with the front and rear sealing jaws 34, 36 (and the heating elements 50). In particular, as shown in FIG. 5, the user can adjust the height of the shelf 54 so that the vertical distance or height "H" between the bottom of the back portion 86 of the shelf 54 and the front and rear sealing jaws 34, 36 corresponds approximately to the vertical distance between the sealable member 130 and the bottom edge of the envelope 120, which causes the sealable member 130 to align with the front and rear sealing jaws 34, 36 when the envelope 120 is placed on the shelf 54.

As can be seen in FIG. 5, the back portion 92 of the shelf guide 90 has slots 93 formed therein to accommodate the upward and downward movement of the mounting arms 102 of the shelf support mechanism 56 as the shelf 54 is raised and lowered. As discussed above, the shelf 54 typically is oriented as depicted in FIGS. 3 and 5, so that the envelope 120 is restrained from downward movement by the lip 88 of the shelf 54. The envelope 120 thus remains supported by the shelf 54 as the front and rear sealing jaws 34, 36 engage the upper portion of the envelope 120 and form the closure seal 132. Upon completion of the sealing cycle, the shelf 54 can be tilted in the forward direction by the actuator 98 acting through the mounting arms 102. The tilting of the shelf 54 causes the newly sealed envelope 120 to fall off of the shelf 54, and downward through the opening 30 in the lower platform 26. As discussed above, the envelope 120 subsequently can be transported on the conveyor 60 located below the opening 30, or can be collected in a box or crate positioned below the opening 30.

The tilting of the shelf 54 can be performed automatically upon the completion of each sealing cycle, in response to an input generated by the controller 112. Alternatively, the tilting can be initiated by a user input provided via a pushbutton or other suitable device communicatively coupled to the controller 112. In alternative embodiments, the shelf 54 can be configured to be tilted manually. In such embodiments, the shelf 54 can biased by a spring into an upright position as shown in FIGS. 3 and 5 and can be titled by the application of force by the user against the spring bias. Alternatively, the shelf 54 can be restrained in the upright, i.e., non-tilted, position by a latch or other device that can be released when it is desired to tilt the shelf 54. In other alternative embodiments, the shelf 54 can be configured without any tilting capability. In such embodiments, the user can lift the sealed envelope 120 from the shelf 54 and drop the envelope 120 through the opening 30 in the lower platform 26. Alternatively, the user can lift the envelope 120 upwardly, through the opening 44 in the cover 42.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above-described embodiments. Rather, the scope of the present solution should be defined in accordance with the following claims and their equivalents.

Figure 9:
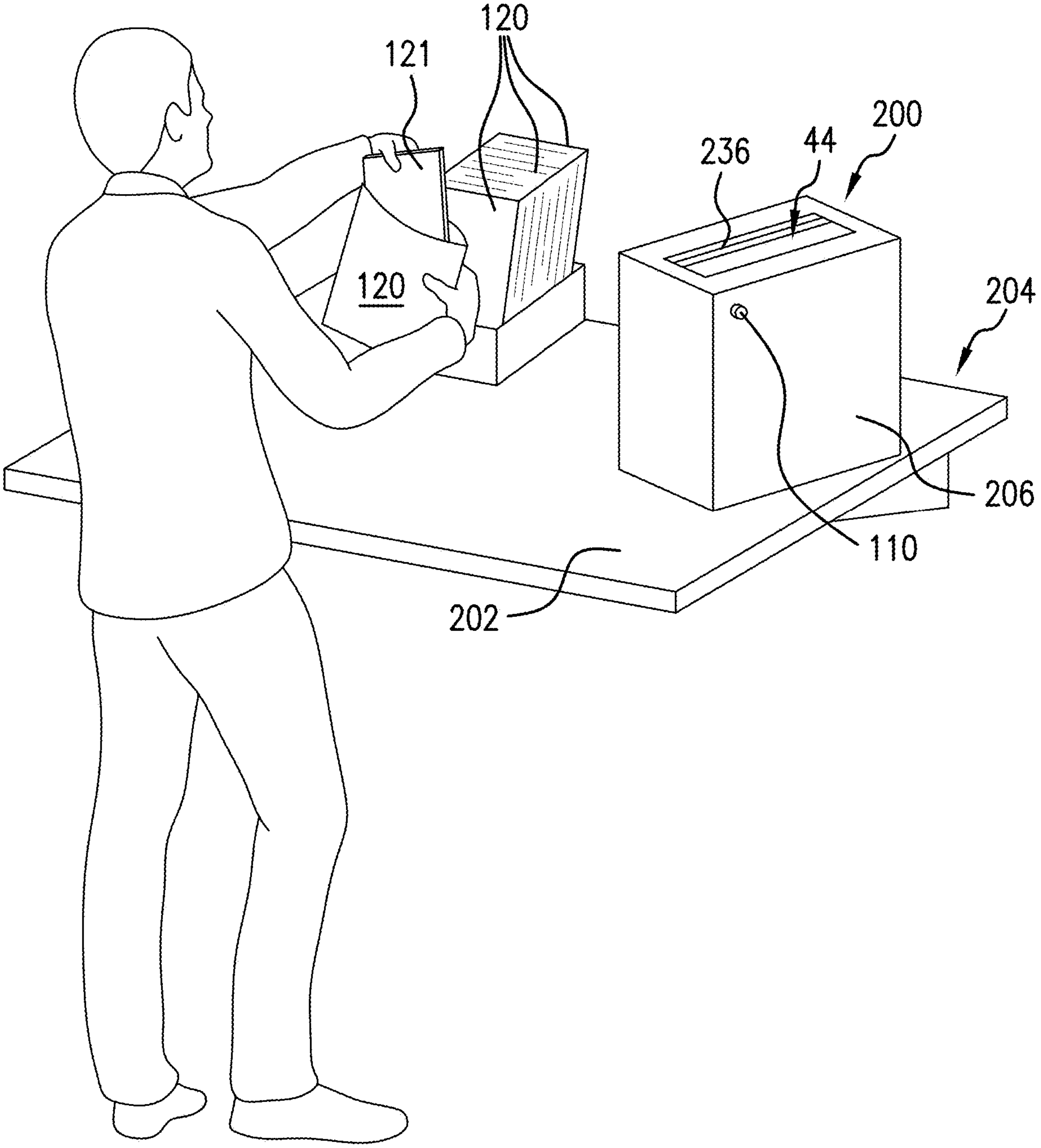
FIG. 9 is a top-front perspective view of an alternative embodiment of the station shown in FIGS. 1-6, depicting the station resting on a wall-mounted shelf.

FIG. 9 depicts an alternative embodiment of the station 10 in the form of a stand-alone tabletop station 200. The station 200 is substantially similar to the station 10, with the exception that the station 200 does not include a base 12. Also, the station 200 is more compact than the station 10, so that the station 10 can be placed directly on an elevated surface such as the upper surface 202 of a wall-mounted shelf 204 as depicted in FIG. 9. The upper surface 202 can act as a working surface on which a supply of unfilled envelopes 120 can be placed so that an operator easily can retrieve, load, and seal each envelope 120 in a standing or seated position using the station 200. Alternative embodiments of the station 200 can be configured so that the station can be clamped or otherwise secured to the upper surface 202 of the wall-mounted shelf 204 in a manner in which a portion of the station overhangs an edge of the shelf 204, and the sealed envelope 120 can drop into a container or conveyor positioned beneath the overhanding portion of the station.

Figure 10:
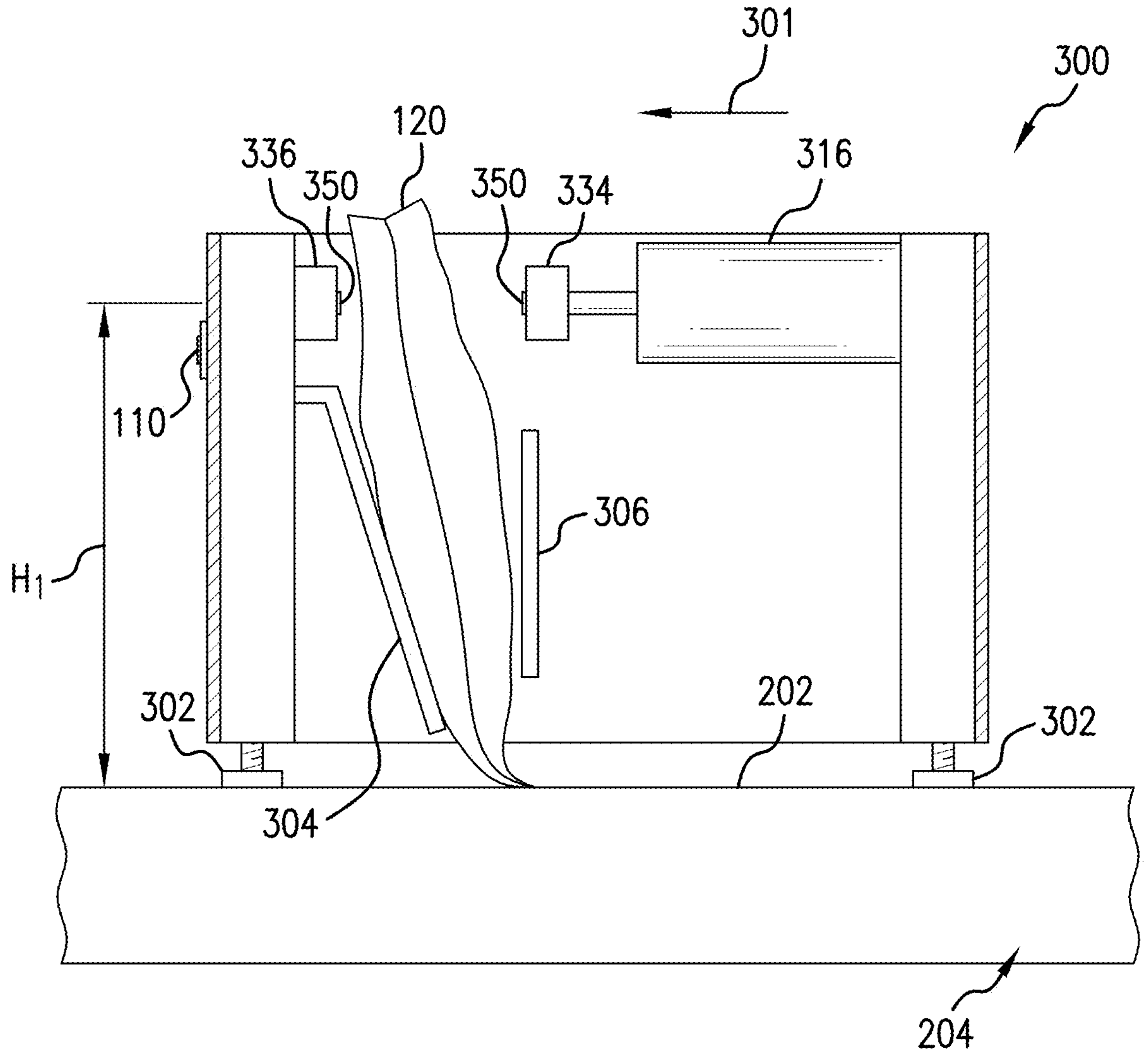
FIG. 10 is a side cross-sectional side view of another alternative embodiment of the station shown in FIGS. 1-6, depicting the station resting on the wall-mounted shelf shown in FIG. 9.

FIG. 10 depicts, in cross section, another alternative embodiment of the station 10 in the form of another stand-alone tabletop station 300. The station 300 is substantially similar to the station 200, with the exception that the station 300 includes spacers in the form of adjustable feet 302. Also, the bottom of the station 300 is open so that that the envelope 120 rests directly on the upper surface 202 of the wall-mounted shelf 204. The adjustable feet 302 permit the station 300 to be raised and lowered in relation to the surface 202, so that the height "$H_1$" of front and rear sealing jaws

336, 334 above the surface 202 can be adjusted so as to align the sealable member 130 of the envelope 120 with the front and rear sealing jaws 336, 334 when the bottom edge of the envelope 120 is resting on the surface 202 as depicted in FIG. 10. The station 300 also includes a sloped side support wall 304 and an opposite wall 306 that help to support and position the envelope 120.

FIG. 10 also shows an actuator mechanism 316 configured to move the rear sealing jaw 334 toward and away from the front sealing jaw 336. The rear sealing jaw 334 is movable in the direction denoted by the arrow 301. A respective heating element 350 is located on each of the front and rear sealing jaws 336, 334. The combination of heat and pressure applied to the envelope 120 by the front and rear sealing jaws 336, 334 and the heating element 350 causes the sealable member 130 to form the closure seal 132 that seals the top of the envelope 120, as discussed above in relation to the station 10. In alternative embodiments, front sealing jaw 336 can be configured to be movable in addition to, or instead of, the rear sealing jaw 334.

Figure 11:
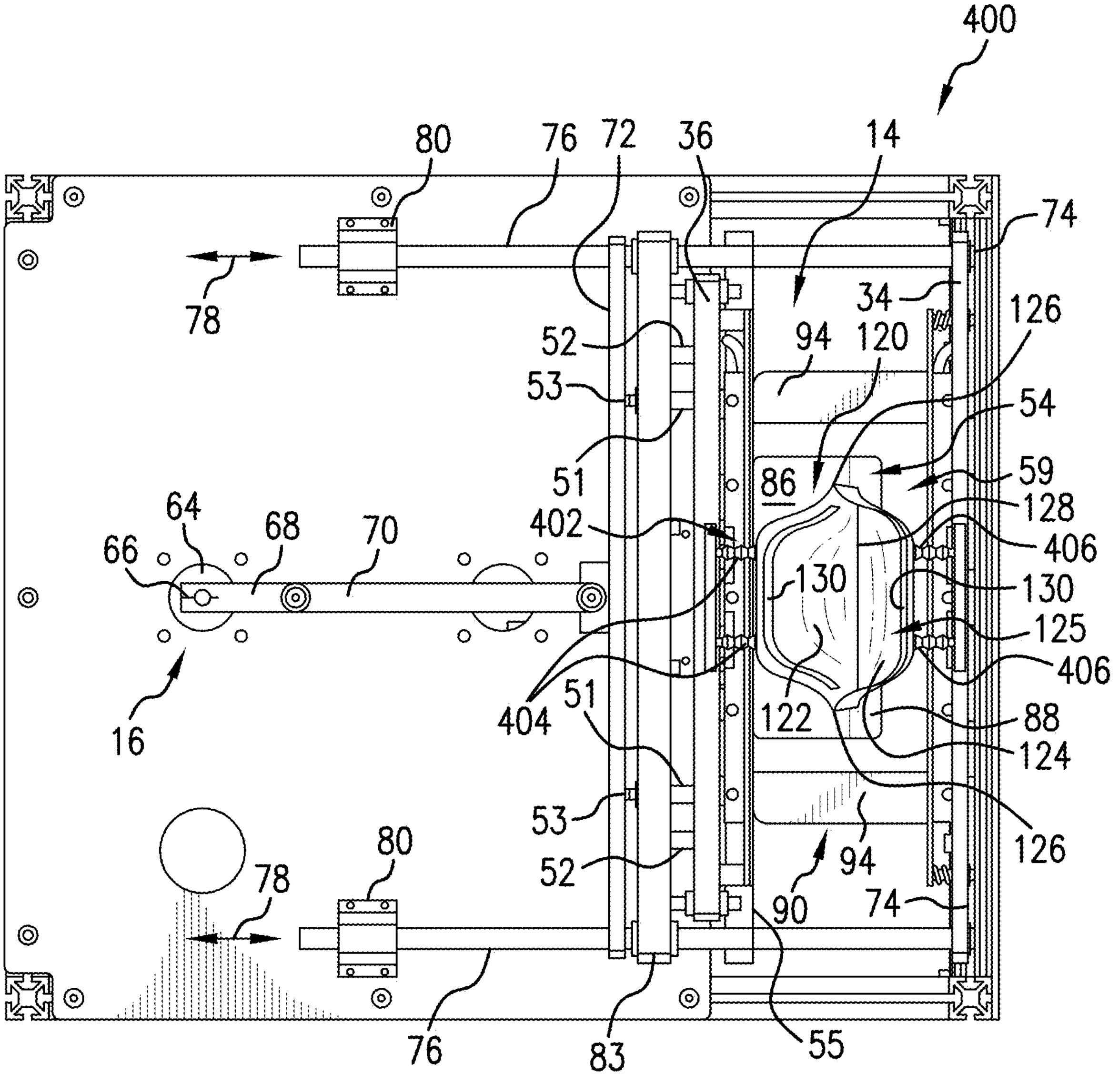
FIG. 11 is a top view of another alternative embodiment of the station shown in FIGS. 1-6.

FIG. 11 depicts another alternative embodiment of the station 10 in the form of a station 400. The station 400 is substantially identical to the station 10, with the following exceptions. Components of the station 400 that are identical to those of the station 10 are identified in figures using identical reference numbers.

The station 400 includes a wall handling device 402. The wall handling device 402 includes four suction cups 404, 406. Each suction cup 404, 406 is in fluid communication with a vacuum source (not shown). The suction cups 404 are mounted on the rear sealing jaw 36, and the suction cups 406 are mounted on the front actuator bar 74. The suction cups 404 are configured to grasp the wall 122 of the envelope 120, and the suction cups 406 are configured to grasp the wall 124 in response to the vacuum applied to the suction cups 404, 406.

The station 400 can be configured to open the envelope 120 after the envelope 120 has been placed on the shelf 54. In particular, the front actuator bar 74 can be advanced in the rearward direction to bring the suction cups 406 into contact with the wall 124 of the envelope 120. The rearward movement of the front actuator bar 74 subsequently urges the wall 122 into contact with the suction cups 404. At this point, the front actuator bar 74 can be moved in the forward direction. The suction exerted by the suction cups 406 on the wall 124 causes the wall 124 to be drawn in the forward direction by the front actuator bar 74. The suction exerted by the suction cups 404 on the wall 122 causes the center portion of the wall 122 to remain stationary. The forward movement of the front actuator bar 74 and the suction cups 406 thus forms the opening 140 to the envelope pocket 125, allowing the item 121 to be placed in the envelope pocket 125. The envelope 120 then can be sealed as described above in relation to the envelope 120.

The wall handling device 402 can other types of devices for urging the walls 122, 124 apart to form the opening 140. For example, the wall handling device 402 include articulating fingers that grasp the upper edges of the respective walls 122, 124, or a blower that separates the wall 122, 124 using forced air.

Figure 12:
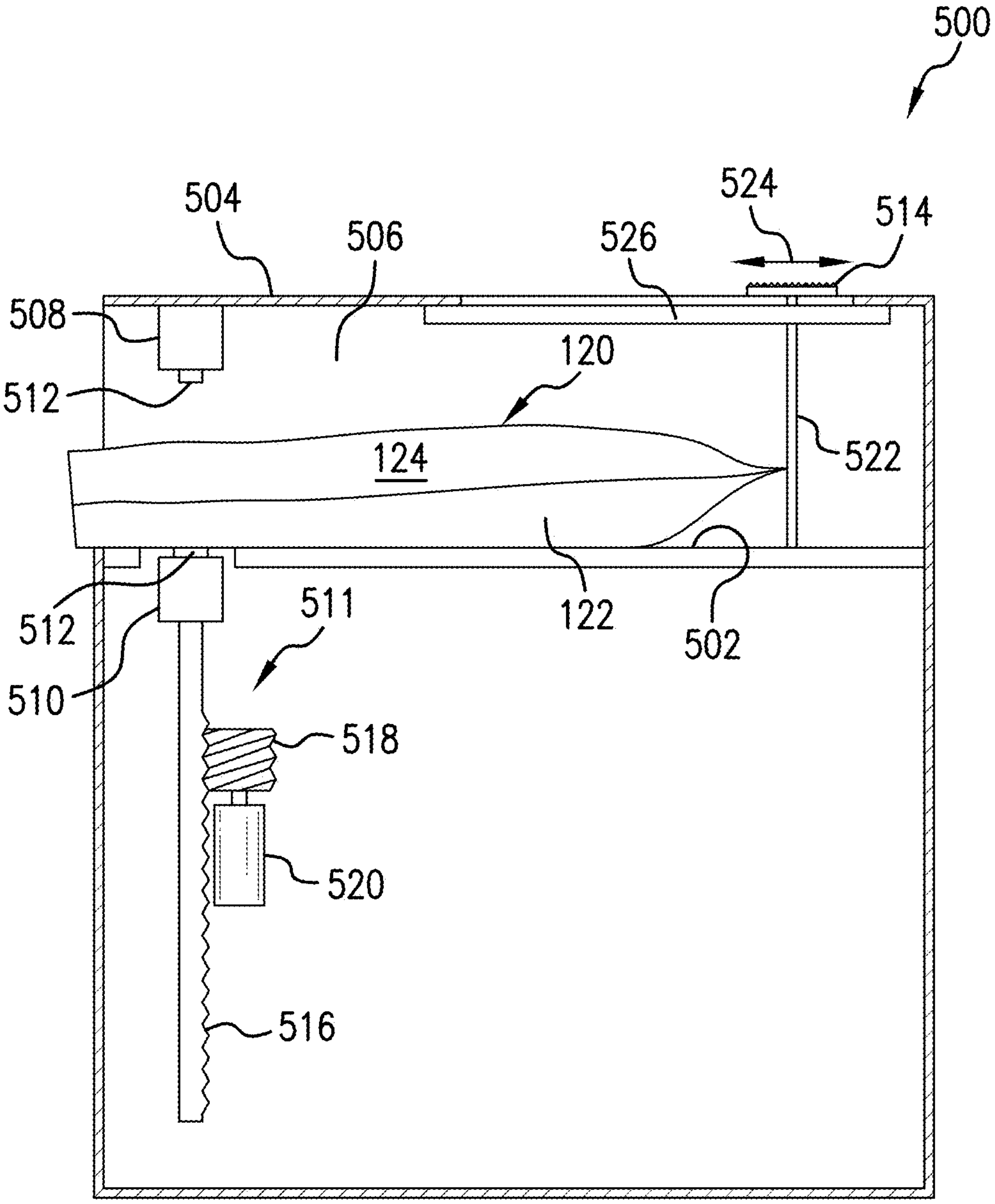
FIG. 12 is a cross-sectional side view of another alternative embodiment of the station shown in FIGS. 1-6.

FIG. 12 depicts another alternative embodiment of the station 10 in the form of a station 500. The station 500 is configured to allow the envelope 120 to be sealed while in a horizontal orientation.

The station 500 includes a horizontal envelope support surface 502 on which the envelope 120 can rest upon being inserted into the station 500. The envelope support surface 502 and a top portion 504 of the station 500 define a sealing area 506 within the station 500. In other alternate embodiments the envelope support surface 502 can be oriented at an oblique angle.

The station 500 also includes an upper sealing jaw 508, a lower sealing jaw 510, and an actuating mechanism 511. A respective heating element 512 is located on each of the upper and lower sealing jaws 508, 510. The upper sealing jaw 508 is fixed to an underside of the top portion 504 of station 500. The lower sealing jaw 510 is fixed to an actuator bar 516 of the actuating mechanism 511.

The actuating mechanism 511 also includes a worm gear 518, and an actuator 520 configured to rotate the worm gear 518. The worm gear 518 is configured to engage teeth formed in the actuator bar 516, so that rotation of the worm gear 518 imparts an upward or downward movement to the actuator bar 516 and the attached lower sealing jaw 510. The actuating mechanism 511 can have other configurations in alternative embodiments of the station 500.

The station 500 also includes a stop 522. The stop 522 is located within the sealing area 506, is configured to contact the bottom edge of the envelope 120 when the envelope 120 is placed on the envelope support surface 502. The stop 522 is movable in the direction denoted by the arrow 524, so that the horizontal position of the stop 522 in relation to the upper and lower sealing jaws 508, 510 can be adjusted. This feature permits the sealable member 130 of the envelope 120 to be aligned with the upper and lower sealing jaws 508, 510, with the surface of the stop that contacts the bottom edge of the envelope 120 acting as a positioning surface.

An upper end of the stop 522 can connected to a knob 514 located above the top portion 504 of the station 500, so that the user can move the stop 522 manually. The stop 522 can be positioned on a spacer in the form of a mount 526 configured to exert a frictional force on the stop 522 that causes the stop 522 to remain in place once positioned by the operator.

In other alternative embodiments, the station 500 can include a lateral guide located within the sealing area 506. The lateral guide can be configured, and positioned with respect to the upper and lower sealing jaws 508, 510 and the envelope support surface 502 so as to direct and orient the envelope 120 laterally into contact with the stop 522. In some embodiments, the lateral guide can be configured similarly to the sidewalls 94 of the station 10.

Once the envelope 120 has been placed on the envelope support surface 502 within the sealing area 506 and the position of the stop 522 has been adjusted so as to align the sealable member 130 with the upper and lower sealing jaws 508, 510, a sealing cycle can commence automatically, or in response to an input provided by the operator by way of a push button or other suitable input device (not shown). When the sealing cycle is initiated, the actuator 520 of the actuating mechanism 511 is activated so as to advance the lower sealing jaw 510 upwardly. upward movement of the lower sealing jaw 510 eventually urges the envelope 120 into contact with the upper sealing jaw 508. The combination of heat and pressure applied to the envelope 120 by the upper and lower sealing jaws 508, 510 and the heating element 512 causes the sealable member 130 to form the closure seal 132 that seals the top of the envelope 120, as discussed above in relation to the station 10.

Once the upper and lower sealing jaws 508, 510 and the heating element 512 have remained in contact with the envelope 120 for an amount of time sufficient to form the closure seal 132, the actuating mechanism 511 can be activated to move the lower sealing jaw 510 downward, to its initial position, and the sealed envelope 120 can be removed from the station 500.

What is claimed is:

1. A station for sealing an envelope, comprising:

a sealing mechanism comprising a first and a second sealing member configured to apply heat and pressure to a sealable member of the envelope disposed between the first and second sealing members, the heat and pressure being sufficient to activate the sealable member to form a closure seal in the envelope;

a spacer configured to position the first and second sealing members at a predetermined first distance from a positioning surface that corresponds to a spacing between a closed bottom of the envelope and the sealable member to align the sealable member with the first and second sealing members when the envelope is positioned against the positioning surface; and a lateral guide configured and positioned with respect to the sealing mechanism and spacer to guide and orient the envelope laterally into contact with the positioning surface.

2. The station of claim 1, wherein the lateral guide comprises a sidewall configured to center the envelope with respect to the first and second sealing members.

3. The station of claim 2, wherein the sidewall is inclined inwardly and downwardly.

4. The station of claim 2, wherein:

the sidewall is a first sidewall and the lateral guide further comprises a second sidewall; and the lateral guide is configured so that a spacing between the first and second sidewalls is variable.

5. The station of claim 1, wherein the positioning surface comprises an envelope support surface configured to support the envelope.

6. The station of claim 5, further comprising a shelf, wherein the shelf comprises the spacer and the positioning surface.

7. The station of claim 6, wherein the shelf is configured to tilt between a first angular orientation position at which the positioning surface of the shelf supports the envelope, and a second angular orientation at which the envelope can fall from the shelf.

8. The station of claim 6, wherein:

the shelf comprises a lip, and a back portion connected to the lip;

the positioning surface comprises an upper surface of the lip;

the spacer comprises the back portion; and the upper surface of the lip is configured to engage a bottom edge of the envelope.

9. The station of claim 8, wherein:

a major surface of the back portion is configured to engage a wall of the envelope; and the major surface of the back portion is angled in relation to the vertical direction.

10. The station of claim 6, further comprising a base, wherein the shelf and the sealing mechanism are mounted on the base.

11. The station of claim 10, further comprising a column mounted on the base, wherein the shelf is mounted on the column, and the column is configured to raise and lower the shelf in relation to the sealing mechanism.

12. The station of claim 10, wherein:

the base comprises a plurality of legs, and a platform coupled to and supported by the legs; and at least one of the sealing mechanism and the shelf is mounted on the platform.

13. The station of claim 12, wherein:

the platform is a first platform; and the station further comprises a second platform coupled to and supported by the legs and positioned below the first platform.

14. The station of claim 13, wherein:

the sealing mechanism is mounted on the first platform; and the shelf is mounted on the second platform.

15. The station of claim 13, wherein:

the second platform has an opening therein; and the opening is located below, and is aligned with the shelf.

16. A packing and conveying system, comprising:

the station of claim 15; and at least one of a conveyor and a container configured to be positioned below the opening in the second platform and to receive the envelope by way of the opening.

17. The station of claim 1, further comprising an actuator mechanism configured to move the first sealing member between a first position and a second position.

18. The station of claim 17, wherein the first sealing member is further configured to urge the envelope into the second sealing member when the first sealing member is in the second position of the first sealing member so that the sealable member is squeezed and compressed.

19. A packaging system, comprising:

the station for sealing an envelope of claim 1; and a plurality of envelopes unconnected to each other and each comprising:

a first flexible wall, a second flexible wall overlying the first flexible wall and fixed to the first flexible wall about at least a portion of a pocket border, which pocket border encloses a pocket defined between the first and second flexible walls and configured and dimensioned to contain an item, at least one of the first and second flexible walls defining a pocket opening allowing access to the pocket from an exterior of the envelope for loading the item into the pocket, and a sealable member disposed on the first wall and configured to form a closure seal that fixes the first wall to the second wall at the pocket opening to seal the pocket closed.

20. The system of claim 19, wherein the positioning surface comprises an envelope support surface configured to support the envelope.

21. The system of claim 20, further comprising a shelf, wherein the shelf comprises the spacer and the positioning surface.

22. The system of claim 21, wherein:

the shelf is configured to support a lower edge of the envelopes; and a distance between the lower edge of the envelopes and the sealable member of the envelopes is about equal to a distance between the surface of the shelf and the first sealing member.

23. The system of claim 19, wherein the first sealing member is a first sealing jaw, and the second sealing member is a second sealing jaw.

24. The system of claim 19, wherein the sealable member comprises a heat-activatable material.

25. The system of claim 24, wherein the heat-activatable material is one of a heat-sealable material and a hot-melt adhesive.

26. The system of claim 25, wherein at least one of the first and second sealing members comprises a heating element.

27. The system of claim 19, wherein at least one of the first and second walls of the envelope comprises paper.

28. The system of claim 27, wherein at least one of the first and second walls of the envelope comprises extensible paper.

* * * * *